US012807440B2

(12) United States Patent
Sakai

(10) Patent No.: US 12,807,440 B2
(45) Date of Patent: Nov. 24, 2026

(54) MEDIA CONVEYING APPARATUS, CONTROL METHOD, AND NON-TRANSITORY RECORDING MEDIUM

(71) Applicant: PFU LIMITED, Kahoku (JP)

(72) Inventor: Masaaki Sakai, Kahoku (JP)

(73) Assignee: PFU LIMITED, Kahoku (JP)

( * ) Notice: Subject to any disclaimer, the term of this patent is extended or adjusted under 35 U.S.C. 154(b) by 259 days.

(21) Appl. No.: 18/733,584

(22) Filed: Jun. 4, 2024

(65) Prior Publication Data

US 2024/0317521 A1 Sep. 26, 2024

Related U.S. Application Data

(63) Continuation of application No. PCT/JP2021/046857, filed on Dec. 17, 2021.

(51) Int. Cl.
*B65H 7/06* (2006.01)
*H04N 1/00* (2006.01)

(52) U.S. Cl.
CPC ........... *B65H 7/06* (2013.01); *H04N 1/00037* (2013.01); *H04N 1/00082* (2013.01); *B65H 2553/30* (2013.01); *B65H 2801/39* (2013.01)

(58) Field of Classification Search
CPC .. B65H 7/06; B65H 2553/30; B65H 2801/39; H04N 1/00082; H04N 1/00037
See application file for complete search history.

(56) References Cited

U.S. PATENT DOCUMENTS

| | | | | |
|---|---|---|---|---|
| 2017/0158447 | A1* | 6/2017 | Link | B65H 5/062 |
| 2019/0116292 | A1* | 4/2019 | Fujiki | H04N 1/38 |
| 2020/0172357 | A1* | 6/2020 | Arimori | B65H 3/063 |
| 2021/0099602 | A1* | 4/2021 | Harada | H04N 1/121 |

FOREIGN PATENT DOCUMENTS

| | | | |
|---|---|---|---|
| JP | 2008-271537 | A | 11/2008 |
| JP | 2015-78039 | A | 4/2015 |

(Continued)

OTHER PUBLICATIONS

International Search Report dated Mar. 8, 2022 for corresponding PCT Application No. PCT/JP2021/046857 (3 pages) with English Translation (2 pages).

(Continued)

*Primary Examiner* — Thomas A Morrison
(74) *Attorney, Agent, or Firm* — WOMBLE BOND DICKINSON US LLP

(57) ABSTRACT

A media conveying apparatus includes a conveyor to convey a medium, an imager to image the conveyed medium to obtain an image, and circuitry. The circuitry determines whether the conveyed medium has an adhering object, controls the conveyor to stop conveyance of a subsequent medium following the conveyed medium based on a determination result indicating that the conveyed medium has an adhering object, controls the conveyor to resume medium conveyance according to a received instruction to resume medium conveyance, and controls the conveyor to stop medium conveyance again in response to completion of conveyance of a first medium that is firstly conveyed after the conveyance of the subsequent medium is stopped.

8 Claims, 11 Drawing Sheets

(56) References Cited

FOREIGN PATENT DOCUMENTS

| | | | |
|---|---|---|---|
| JP | 2016-135705 | A | 7/2016 |
| JP | 2016-222451 | A | 12/2016 |

OTHER PUBLICATIONS

Written Opinion dated Mar. 8, 2022 for corresponding PCT Application No. PCT/JP2021/046857 (3 pages) with English Translation (3 pages).
International Preliminary Report on Patentability dated Jun. 13, 2024 for corresponding PCT Application No. PCT/JP2021/046857 (4 pages) with English Translation (4 pages).

* cited by examiner

MEDIA CONVEYING APPARATUS, CONTROL METHOD, AND NON-TRANSITORY RECORDING MEDIUM

CROSS-REFERENCE TO RELATED APPLICATION

This patent application is a continuation application of International Application No. PCT/JP2021/046857 having an international filing date of Dec. 17, 2021, the entire disclosure of which is hereby incorporated by reference herein.

BACKGROUND

The present disclosure relates to a media conveying apparatus, a control method, and a non-transitory recording medium.

Media conveying apparatuses such as scanners perform a media reading process in which multiple media are imaged while being conveyed. If a medium to which an object such as a sticky note or label (sticker) adheres is conveyed, there is a possibility that a character or figure printed on the medium is covered with the adhering object and is not imaged (i.e., an image of the character or figure is not captured). If multiple media conveyed successively include a medium having an adhering object thereon, a user needs to extract the medium having the adhering object thereon from the multiple media having been read, remove or displace the adhering object, and operate the media conveying apparatus to execute a media reading process again. In a such case, the user needs to reattach the adhering object to the medium or return the adhering object to its original position after the media reading process is executed again.

An image reading apparatus known in the art performs the following control operation when a multi-feed is detected. The known image reading apparatus stops the reading of a subsequent document and performs a selected post-multi-feed-detection process after the completion of the reading of the document for which the multi-feed has been detected. The image reading apparatus selects the post-multi-feed-detection process from a process of resuming the successive image reading of the media including re-reading of the document for which the multi-feed has been detected and a process of resuming the successive image reading from the document subsequent to the document for which the multi-feed has been detected.

SUMMARY

In one aspect, a media conveying apparatus includes a conveyor to convey a medium, an imager to image the conveyed medium to obtain an image, and circuitry. The circuitry determines whether the conveyed medium has an adhering object, controls the conveyor to stop conveyance of a subsequent medium following the conveyed medium based on a determination result indicating that the conveyed medium has an adhering object, controls the conveyor to resume medium conveyance according to a received instruction to resume medium conveyance, and controls the conveyor to stop medium conveyance again in response to completion of conveyance of a first medium that is firstly conveyed after the conveyance of the subsequent medium is stopped.

In another aspect, a method of controlling a media conveying apparatus includes conveying a medium with a conveyor, imaging the conveyed medium with an imager to obtain an image, determining whether the conveyed medium has an adhering object, controlling the conveyor to stop conveyance of a subsequent medium following the conveyed medium based on a determination result indicating that the conveyed medium has an adhering object, controlling the conveyor to resume medium conveyance according to a received instruction to resume medium conveyance, and controlling the conveyor to stop medium conveyance again in response to completion of conveyance of a first medium that is firstly conveyed after the conveyance of the subsequent medium is stopped.

In another aspect, a non-transitory recording medium stores a plurality of program codes which, when executed by one or more processors, causes the processors to perform a method of controlling a media conveying apparatus. The method includes conveying a medium with a conveyer, imaging the conveyed medium with an imager to obtain an image, determining whether a conveyed medium has an adhering object, controlling the conveyor to stop conveyance of a subsequent medium following the conveyed medium based on a determination result indicating that the conveyed medium has an adhering object, controlling the conveyor to resume medium conveyance according to a received instruction to resume medium conveyance, and controlling the conveyor to stop medium conveyance again in response to completion of conveyance of a first medium that is firstly conveyed after the conveyance of the subsequent medium is stopped.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
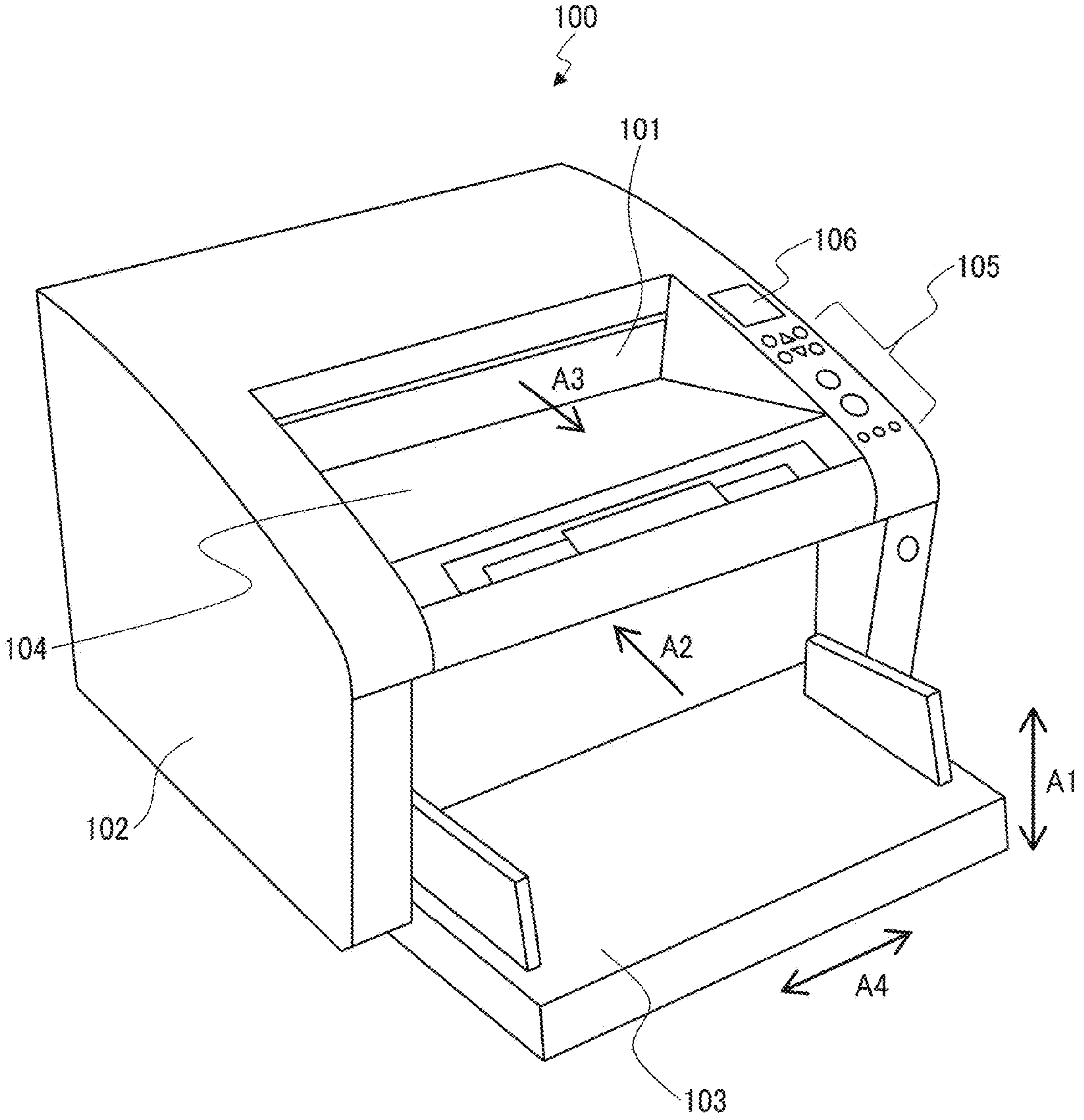
FIG. 1 is a perspective view of a media conveying apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The advantages of the present disclosure are recognized and achieved by the elements particularly pointed out in the appended claims and the combinations thereof. It is to be understood that both the above-described general description and the detailed description are exemplary and explanatory only and are not intended to restrict the claimed invention.

A description of a media conveying apparatus, a control method, and a control program according to embodiments of the present disclosure is given below with reference to the drawings.

FIG. 1 is a perspective view of a media conveying apparatus 100, which is an image scanner, according to an embodiment of the present disclosure. The media conveying apparatus 100 conveys media that are documents and images the media. The media are, for example, sheets of plain paper, sheets of thick paper, or cards. The media include a medium having an adhering object such as a sticky note or a label (sticker) thereon. The media conveying apparatus 100 may be, for example, a facsimile machine, a copier, or a multifunction peripheral (MFP). An MFP may be also called a multifunction printer.

The media conveying apparatus 100 includes a first housing 101, a second housing 102, a media table 103, an ejection table 104, an operation device 105, and a display device 106.

The first housing 101 is positioned in an upper portion of the media conveying apparatus 100 and is hinged to the second housing 102 to be opened and closed at the time of, for example, jamming a medium or clearing of the inside of the media conveying apparatus 100.

The media table 103 is engaged with the second housing 102 such that the media to be conveyed can be placed on the media table 103. The media table 103 is disposed on a side of the second housing 102 from which the media are fed. The media table 103 is movable by a motor in the direction indicated by arrow A1, which is substantially vertical (height direction). When no media are conveyed, the media table 103 is positioned at the lower end of the movable range to facilitate the placement of media thereon. When a medium is conveyed, the media table 103 is raised to the position at which the medium on the top of the media table 103 contacts a pick roller described later. The ejection table 104 is formed on the first housing 101 to be able to hold the media ejected from the media conveying apparatus 100.

The operation device 105 includes an input device such as buttons and an interface circuit that receives signals from the input device. The operation device 105 receives an input operation performed by a user and outputs an operation signal corresponding to the input operation performed by the user. The display device 106 includes a display and an interface circuit that outputs image data to the display and displays the image data on the display. Examples of the display include a liquid crystal display and an organic electro-luminescence (EL) display.

In FIG. 1, arrow A2 indicates the direction in which a medium is conveyed (also "medium conveyance direction A2"), and arrow A3 indicates the direction in which the medium is ejected (also "medium ejection direction A3"), and arrow A4 indicates the width direction (also "width direction A4") perpendicular to the medium conveyance direction A2. In the following description, "upstream" refers to "upstream" in the medium conveyance direction A2 or the medium ejection direction A3, and "downstream" refers to "downstream" in the medium conveyance direction A2 or the medium ejection direction A3.

Figure 2:
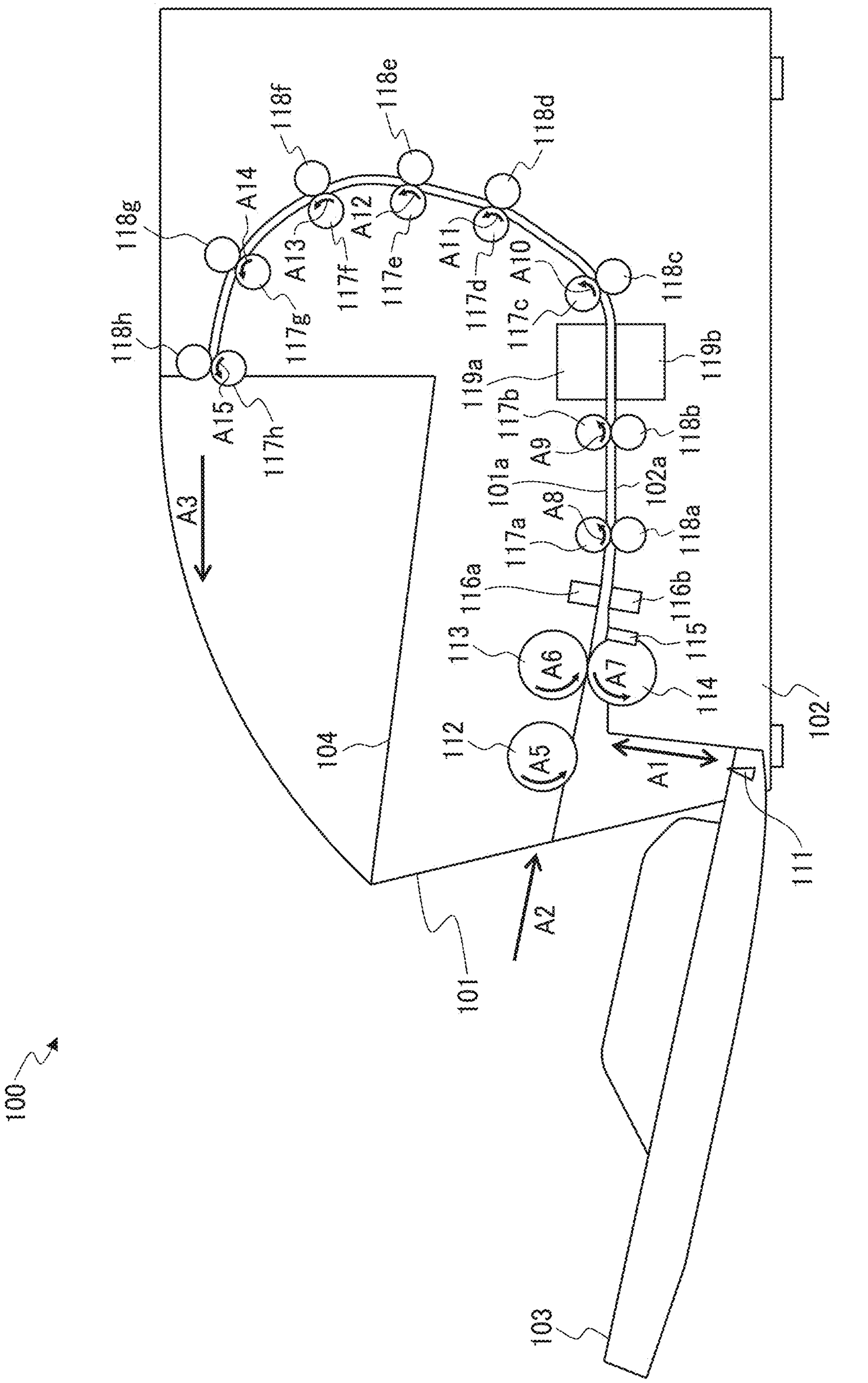
FIG. 2 is a diagram illustrating a medium conveyance passage inside the media conveying apparatus illustrated in FIG. 1.

FIG. 2 is a diagram illustrating a medium conveyance passage inside the media conveying apparatus 100.

The media conveying apparatus 100 includes a first media sensor 111, a pick roller 112, a feed roller 113, a separation roller 114, a second media sensor 115, an ultrasonic transmitter 116*a*, an ultrasonic receiver 116*b*, first to eighth conveyance rollers 117*a* to 117*h*, first to eighth driven rollers 118*a* to 118*h*, and first and second imaging devices 119*a* and 119*b* along the medium conveyance passage.

The pick roller 112, the feed roller 113, the separation roller 114, the first to eighth conveyance rollers 117*a* to 117*h*, and the first to eighth driven rollers 118*a* to 118*h* are examples of a conveyor that conveys media. The number of each of the pick roller 112, the feed roller 113, the separation roller 114, the first to eighth conveyance rollers 117*a* to 117*h*, and the first to eighth driven rollers 118*a* to 118*h* is not limited to one, and may be two or more. When one or more of the pick roller 112, the feed roller 113, the separation roller 114, the first to eighth conveyance rollers 117*a* to 117*h*, and the first to eighth driven rollers 118*a* to 118*h* are formed of multiple rollers, the multiple rollers are arranged at intervals in the width direction A4. In the following description, the first imaging device 119*a* and the second imaging device 119*b* may be collectively referred to the imaging devices 119.

The face of the first housing 101 facing the second housing 102 forms a first guide 101*a* of the medium conveyance passage. The face of the second housing 102 facing the first housing 101 forms a second guide 102*a* of the medium conveyance passage.

The first media sensor 111 is disposed on the media table 103, that is, upstream from the feed roller 113 and the separation roller 114 in the medium conveyance direction A2, and detects whether the medium is placed on the media table 103. The first media sensor 111 determines whether any medium is placed on the media table 103 using a contact sensor that allow a predetermined amount of electrical current to flow when a medium is in contact with the sensor or no medium is in contact with the sensor. The first media sensor 111 generates and outputs a first media signal whose signal value changes depending on whether a medium is placed on the media table 103. The first media sensor 111 is not limited to a contact detection sensor. The first media sensor 111 may be any other sensor such as an optical detection sensor having the capability of detecting the presence of a medium.

The pick roller 112 is disposed in the first housing 101. The pick roller 112 contacts the medium on the media table 103 raised to substantially the same height as the height of the medium conveyance passage, and feeds the medium downstream in the medium conveyance passage.

The feed roller 113 is disposed downstream from the pick roller 112 in the first housing 101 and feeds the medium fed from the media table 103 by the pick roller 112 further downstream in the medium conveyance passage. The separation roller 114 is a so-called brake roller or retard roller and is disposed opposite to the feed roller 113 in the second housing 102. The feed roller 113 and the separation roller 114 perform an operation to separate the media and feed the media one by one. The feed roller 113 is disposed above the separation roller 114, and the media conveying apparatus 100 feeds the media from the top. Alternatively, the feed roller 113 may be disposed in the second housing 102, the separation roller 114 may be disposed in the first housing 101, and the feed roller 113 may feed the media placed on the media table 103 from the bottom.

The second media sensor 115 is disposed downstream from the feed roller 113 and the separation roller 114 and upstream from the ultrasonic transmitter 116*a* and the ultrasonic receiver 116*b*. The second media sensor 115 detects whether a medium is present at that position. The second media sensor 115 includes a light emitter and a light receiver disposed on one side of the medium conveyance passage, and a light guide disposed opposite to the light emitter and the light receiver across the medium conveyance passage. The light guide in the present embodiment is a light guide such as a U-shaped prism. The light emitter is, for example, a light-emitting diode (LED) and emits light toward the medium conveyance passage. The light receiver is, for example, a photodiode and receives the light that is emitted by the light emitter and guided by the light guide. The second media sensor 115 generates and outputs a second media signal based on the intensity of the light received by the light receiver. The second media signal changes in signal value depending on whether a medium is present at the position of the second media sensor 115.

A reflector such as a mirror may be used instead of the light guide. The light emitter and the light receiver may be disposed opposite to each other across the medium conveyance passage. Further, the second media sensor 115 may detect the medium using, for example, a contact detection sensor that feeds a predetermined amount of electrical current when a medium is in contact or not in contact therewith.

The ultrasonic transmitter 116*a* and the ultrasonic receiver 116*b* are disposed downstream from the feed roller 113 and the separation roller 114 and upstream from the first to eighth conveyance rollers 117*a* to 117*h* and the first to eighth driven rollers 118*a* to 118*h*. The ultrasonic transmitter 116*a* and the ultrasonic receiver 116*b* are disposed in the vicinity of the medium conveyance passage and opposite to each other across the medium conveyance passage. The ultrasonic transmitter 116*a* transmits ultrasonic waves. The ultrasonic receiver 116*b* receives the ultrasonic waves transmitted by the ultrasonic transmitter 116*a* and passed through a medium, and generates and outputs an ultrasonic signal which is an electrical signal corresponding to the received ultrasonic waves. The ultrasonic signal indicates pass-through information of the ultrasonic waves passed through the medium. Ultrasonic signals are generated at each of multiple positions on the medium conveyed by the conveyor, and each ultrasonic signal indicates pass-through information of the ultrasonic waves passed through each position on the medium. The pass-through information indicates the magnitude of the ultrasonic waves received by the ultrasonic receiver 116*b*. In the following description, the ultrasonic transmitter 116*a* and the ultrasonic receiver 116*b* may be collectively referred to as the ultrasonic sensor 116. The number of the ultrasonic sensor 116 is not limited to one, and may be two or more. In this case, the multiple ultrasonic sensors 116 are arranged side by side at intervals in the width direction A4.

The first to eighth conveyance rollers 117*a* to 117*h* and the first to eighth driven rollers 118*a* to 118*h* are disposed downstream from the feed roller 113 and the separation roller 114 and convey the medium fed by the feed roller 113 and the separation roller 114 downstream in the medium conveyance passage. The first to eighth conveyance rollers 117*a* to 117*h* and the first to eighth driven rollers 118*a* to 118*h* are disposed to face each other across the medium conveyance passage.

The first imaging device 119*a* is an example of an imager and is disposed downstream from the first conveyance roller 117*a* and the first driven roller 118*a* in the medium conveyance direction A2, that is, downstream from the ultrasonic sensor 116. The first imaging device 119*a* includes an equal-magnification contact image sensor (CIS) as a line sensor. The CIS includes complementary metal oxide semiconductor (CMOS) imaging elements aligned linearly in the main-scanning direction. The first imaging device 119*a* further includes a lens that forms an image on the imaging elements and an analog-to-digital (A/D) converter. The A/D converter amplifies the electrical signals output from the imaging elements and performs analog-to-digital (A/D) conversion. The first imaging device 119*a* images the front side of the medium being conveyed, generates an input image, and outputs the input image.

Similarly, the second imaging device 119*b* is another example of the imager and is disposed downstream from the first conveyance roller 117*a* and the first driven roller 118*a* in the medium conveyance direction A2. The second imaging device 119*b* includes, as a line sensor, an equal-magnification CIS that includes CMOS imaging elements aligned linearly in the main-scanning direction. The second imaging device 119*b* further includes a lens that forms an image on the imaging elements and an A/D converter. The A/D converter amplifies the electrical signals output from the imaging elements and performs A/D conversion. The second imaging device 119*b* images the back side of the medium being conveyed, generates an input image, and outputs the input image.

Alternatively, the media conveying apparatus 100 may include either the first imaging device 119*a* or the second imaging device 119*b* to read only one side of the media. Further, the line sensor may include, instead of the equal-magnification CIS including CMOS imaging elements, an equal-magnification CIS including charge-coupled device (CCD) imaging elements. Alternatively, a line sensor employing a reduction optical system and including CMOS or CCD imaging elements may be used.

The medium placed on the media table 103 is conveyed between the first guide 101*a* and the second guide 102*a* in the medium conveyance direction A2 as the pick roller 112 and the feed roller 113 rotate in the feeding directions indicated by arrows A5 and A6, respectively. When multiple media are placed on the media table 103, only the medium in contact with the feed roller 113 is separated from the rest of the media on the media table 103 as the separation roller 114 rotate in the direction indicated by arrow A7 which is reverse to the feeding direction.

As the first and second conveyance rollers 117*a* and 117*b* rotate in the directions indicated by arrows A8 and A9, respectively, the medium is fed to the imaging position of the imaging devices 119, guided by the first guide 101*a* and the second guide 102*a*. Then, the medium is imaged by the imaging devices 119. Further, as the third to eighth conveyance rollers 117*c* to 117*h* rotate in the directions indicated by arrows A10 to A15, respectively, the medium is ejected onto the ejection table 104. The ejection table 104 receives the medium ejected by the eighth conveyance roller 117*h*.

Figure 3:
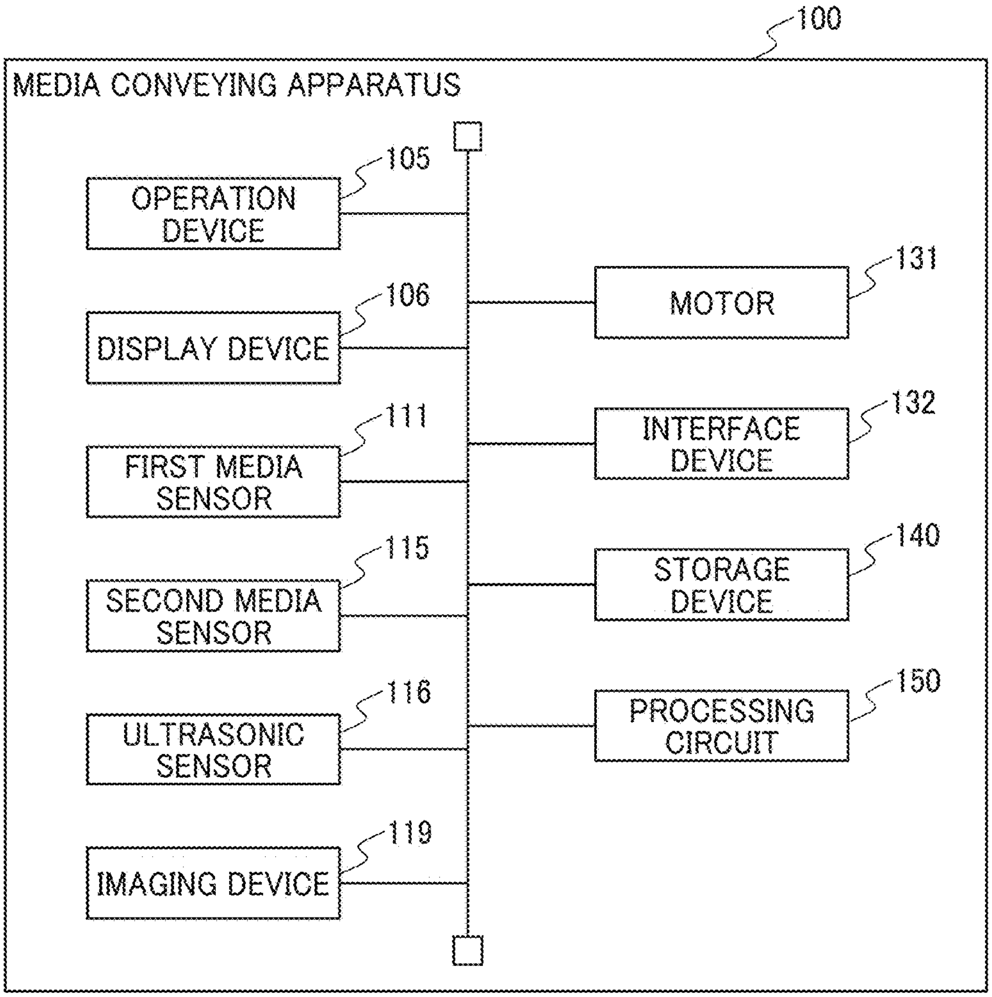
FIG. 3 is a schematic block diagram illustrating a configuration of the media conveying apparatus illustrated in FIG. 1.

FIG. 3 is a schematic block diagram illustrating a configuration of the media conveying apparatus 100.

The media conveying apparatus 100 further includes a motor 131, an interface device 132, a storage device 140, a processing circuit 150, etc. in addition to the above-described components.

The motor 131 includes one or more motors. The motor 131 rotates the pick roller 112, the feed roller 113, the separation roller 114, and the first to eighth conveyance rollers 117*a* to 117*h* according to a control signal from the processing circuit 150 to feed and convey the medium. The first to eighth driven rollers 118*a* to 118*h* may be rotated by the driving force from a motor, instead of being rotated by the respective conveyance rollers.

The interface device 132 includes an interface circuit compatible with a serial bus such as a universal serial bus (USB) and is electrically connected to an information processing device (for example, a personal computer or a mobile information processing terminal) to transmit and receive a read image and various kinds of information to and from the information processing device. A communication device that includes an antenna to transmit and receive wireless signals and a wireless communication interface circuit to transmit and receive signals through a wireless communication line according to a predetermined communication protocol may be used instead of the interface device 132. The predetermined communication protocol is, for example, a wireless local area network (LAN) communication protocol.

The storage device 140 includes memories such as a random-access memory (RAM) and a read-only memory (ROM), a fixed disk device such as a hard disk, a portable memory such as a flexible disk or an optical disk, etc. The storage device 140 stores, for example, computer programs, databases, and tables used for various processes performed by the media conveying apparatus 100. The computer programs may be installed in the storage device 140 from a computer-readable portable recording medium using, for example, a known setup program. The portable recording medium is, for example, a compact disc read-only memory (CD-ROM) or a digital versatile disc read-only memory (DVD-ROM).

The processing circuit 150 operates according to a program prestored in the storage device 140. The processing circuit 150 is, for example, a central processing unit (CPU). Alternatively, the processing circuit 150 may be implemented by a digital signal processor (DSP), a large scale integration (LSI), an application-specific integrated circuit (ASIC), a field-programmable gate array (FPGA), etc.

The processing circuit 150 is connected to, the operation device 105, the display device 106, the first media sensor 111, the second media sensor 115, the ultrasonic sensor 116, the imaging device 119, the motor 131, the interface device 132, the storage device 140, etc. and controls these components. The processing circuit 150 controls the motor 131 to convey the medium, controls the imaging device 119 to obtain an input image, and transmits the input image to an information processing device via the interface device 132. Further, the processing circuit 150 determines whether the medium has an adhering object thereon based on the ultrasonic signal received from the ultrasonic sensor 116 and controls the conveyance of the medium based on the determination result.

Figure 4:
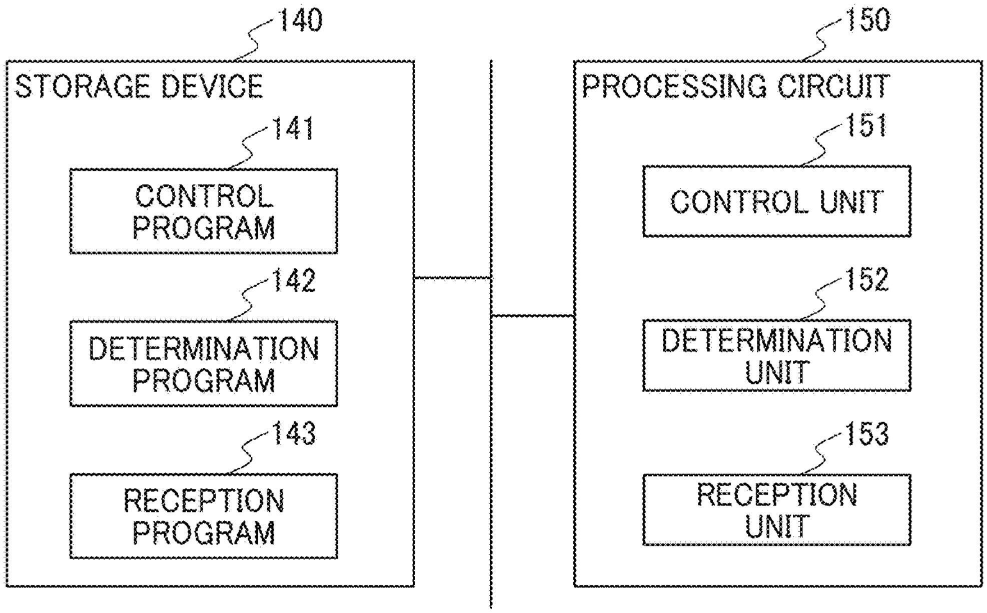
FIG. 4 is a block diagram illustrating schematic configurations of a storage device and a processing circuit illustrated in FIG. 3.

FIG. 4 is a block diagram illustrating a schematic configuration of the storage device 140 and the processing circuit 150.

As illustrated in FIG. 4, the storage device 140 stores programs such as a control program 141, a determination program 142, and a reception program 143. These programs are functional modules implemented by software that operates on the processor. The processing circuit 150 reads the programs from the storage device 140 and operates according to the read programs, thereby functioning as a control unit 151, a determination unit 152, and a reception unit 153.

Figure 5:
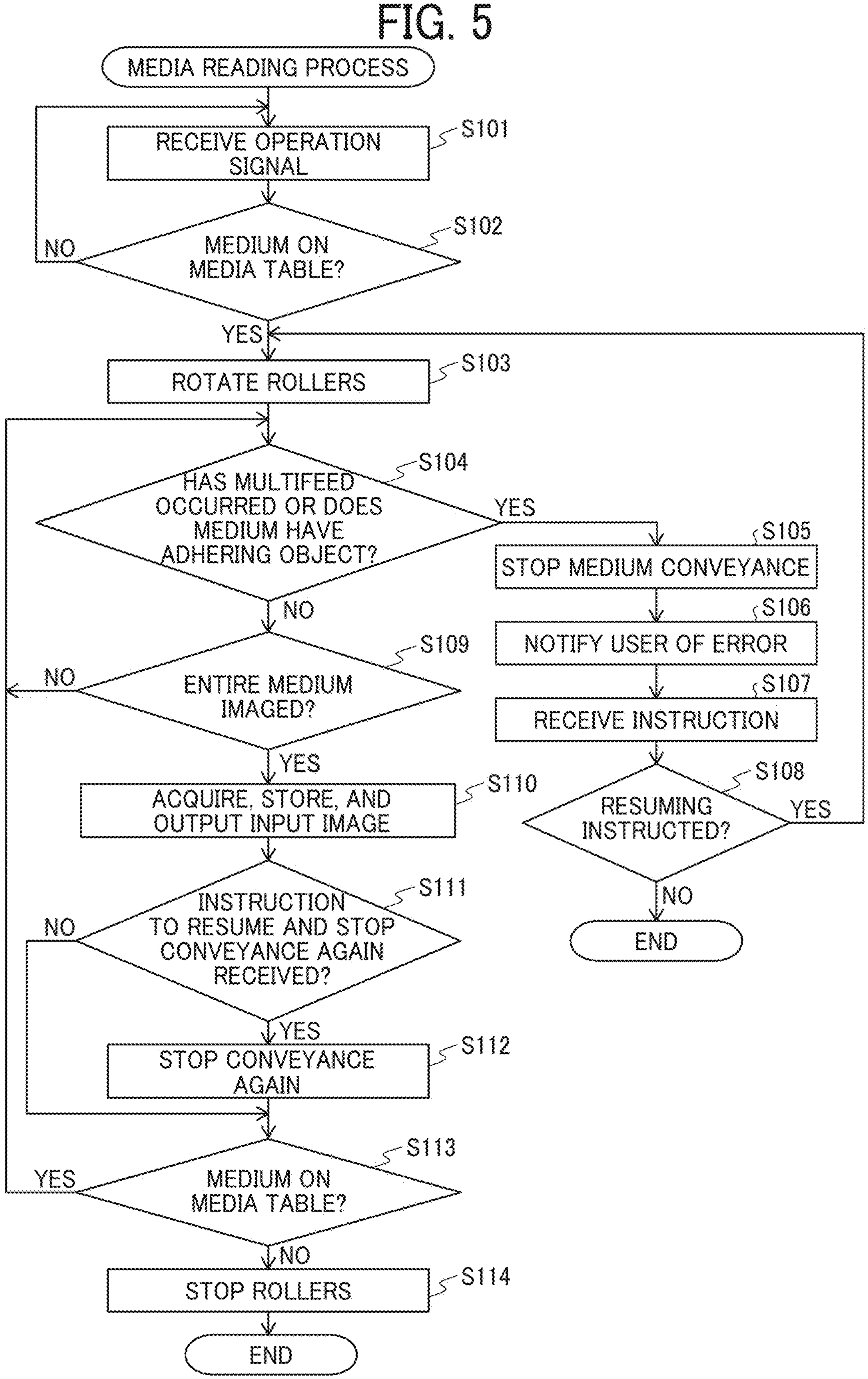
FIG. 5 is a flowchart of example operations in a media reading process.

FIG. 5 is a flowchart of example operations in a media reading process according to an embodiment.

A description of the media reading process performed by the media conveying apparatus 100 is given below with reference to the flowchart of FIG. 5. The sequence of operations described below is executed, for example, by the processing circuit 150 in cooperation with the components of the media conveying apparatus 100 based on the programs prestored in the storage device 140.

In step S101, the control unit 151 stands by until an operation signal instructing the reading of a medium is received from the operation device 105 or the interface device 132. The operation signal is output when a user inputs an instruction to read the medium using the operation device 105 or the information processing device.

In step S102, the control unit 151 receives the first media signal from the first media sensor 111 and determines whether a medium is placed on the media table 103 based on the first media signal. When no medium is placed on the media table 103, the control unit 151 returns the process to step S101 and stands by until a new operation signal is received from the operation device 105 or the interface device 132.

By contrast, when a medium is placed on the media table 103 (YES in step S102), the control unit 151 drives the motor to move the media table 103 to the position from which the medium can be fed. The control unit 151 drives the motor 131 to rotate the pick roller 112, the feed roller 113, the separation roller 114, and the first to eighth conveyance rollers 117*a* to 117*h* to feed and convey the medium from the media table 103 (step S103). In the following description, the expressions like "the control unit 151 feeds and conveys media" mean that media are fed and conveyed by the above-mentioned components under the control of the control unit 151.

Subsequently, the control unit 151 determines whether it is determined that a multi-feed of media has occurred and whether it is determined that an adhering object is on the conveyed medium in an overlap determination process, which is executed in parallel with the media reading process (step S104). In the overlap determination process, the determination unit 152 determines whether a multi-feed of media has occurred and whether an adhering object is on the conveyed medium based on the pass-through information indicated by the ultrasonic signal. The details of the overlap determination process will be described later.

When it is determined that a multi-feed of media has occurred or an adhering object is on the conveyed medium in the overlap determination process (Yes in S104), the control unit 151 stops the motor 131 to stop feeding and conveying media by the conveyor (step S105). When an adhering object is on the conveyed medium, the control unit 151 stops conveying the medium determined as having the adhering object, thereby stopping conveying the subsequent medium following the medium determined as having the adhering object. In other words, the control unit 151 stops feeding and conveying the medium placed on the media table 103 to be conveyed subsequent to the medium determined as having the adhering object. The stop of feeding and conveyance of a medium is an example of error handling.

The media conveying apparatus 100 immediately stops conveying the medium when a multi-feed of media occurs or the medium has an adhering object thereon, thereby preventing the damage to the medium caused by jamming of the medium etc. This feature obviates the need for the user to find the medium multi-fed or with an adhering object from the media stacked on the ejection table 104 and operate the media conveying apparatus 100 to convey the medium multi-fed or with an adhering object again after the conveyance of all the media collectively placed on the media table 103 are completed. This enables the media conveying apparatus 100 to increase the convenience for the user.

The control unit 151 may stop conveying the subsequent medium after ejecting the medium currently conveyed, that is, the medium determined as having an adhering object. This obviates the need for the user to open the first housing 101 and take out the medium remaining in the medium conveyance passage. Thus, the media conveying apparatus 100 can reduce the time and effort of the user and increase the convenience for the user.

Subsequently, the control unit 151 displays information on the occurrence of an error on the display device 106 or transmits the information to the information processing device via the interface device 132 to notify the user of the occurrence of the error (step S106). When a multi-feed of media occurs, the control unit 151 notifies the user of the occurrence of the multi-feed of media. When the medium has an adhering object thereon, the control unit 151 notifies the user that the medium has an adhering object thereon. The notification to the user of the occurrence of a multi-feed of media or that the medium has an adhering object thereon is an example of error handling.

Figure 6:
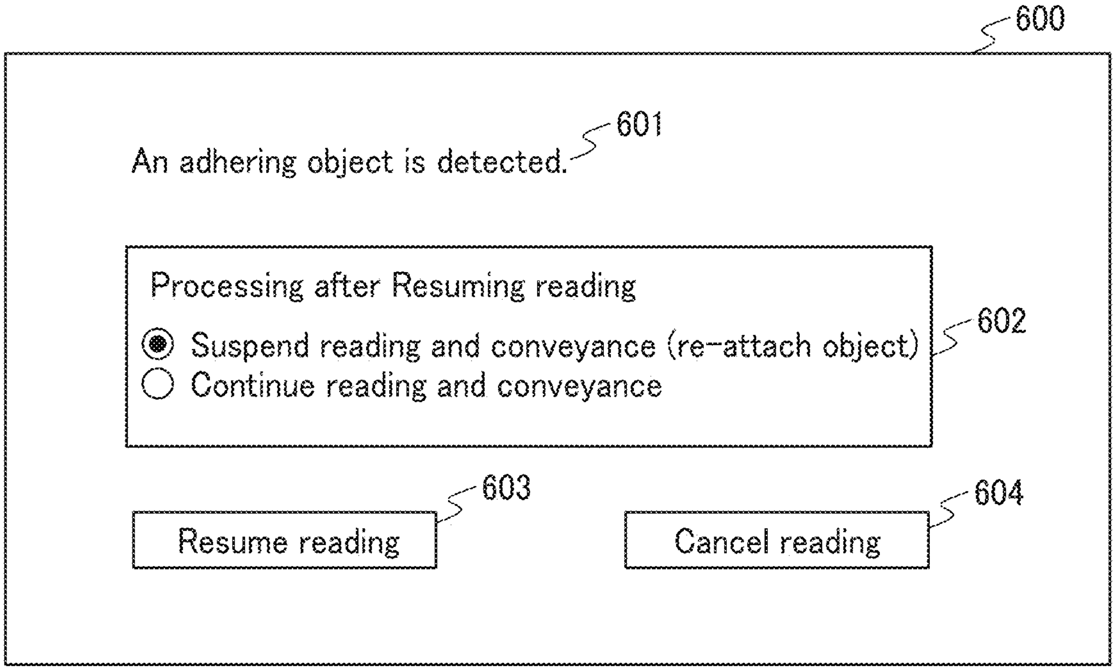
FIG. 6 is a schematic diagram illustrating an example of a notification screen.

FIG. 6 is a schematic diagram illustrating an example of a notification screen 600 for notifying the user that the medium has an adhering object thereon.

As illustrated in FIG. 6, on the notification screen 600, a text 601, a selection field 602, a resume button 603, a cancel button 604, etc. are displayed. The text 601 is a character string indicating that the medium has an adhering object thereon. The selection field 602 is a field for designating whether to stop (suspend) medium conveyance again when the conveyance of the first medium that is firstly conveyed after medium conveyance is resumed is completed. The resume button 603 is a button for instructing to resume medium conveyance. The cancel button 604 is a button for instructing to cancel medium conveyance.

When a multi-feed of media occurs, the user opens the first housing 101, takes out the medium remaining in the medium conveyance passage, and places the medium again on the media table 103. By contrast, when the medium has an adhering object thereon, the user opens the first housing 101, takes out the medium remaining in the medium conveyance passage, removes the adhering object from the medium or displaces the adhering object to an end portion of the medium, and then places the medium again on the media table 103. Then, the user operates the selection field 602 to designate whether to stop medium conveyance again and presses the resume button 603 or the cancel button 604 to designate the subsequent operation.

On the notification screen for notifying the user that a multi-feed of media has occurred, a text for notifying the user that the multi-feed of media has occurred, a resume button for instructing to resume medium conveyance and a cancel button for instructing to cancel medium conveyance are displayed. On this notification screen, a selection field for designating whether to stop medium conveyance again when the conveyance of the first medium is completed after medium conveyance is resumed is not displayed.

Subsequently, the reception unit 153 stands by until an instruction to resume or cancel medium conveyance is received from the operation device 105 or the interface device 132 (step S107). When the resume button 603 is pressed by the user on the notification screen 600, the reception unit 153 receives an instruction to resume medium conveyance. By contrast, when the user presses the cancel button 604 on the notification screen 600, the reception unit 153 receives an instruction to cancel medium conveyance.

In addition, when the reception unit 153 receives the instruction to resume medium conveyance, the reception unit 153 further receives an instruction to stop medium conveyance again or an instruction not to stop medium conveyance. The instruction to stop medium conveyance again is an instruction to stop medium conveyance again when the conveyance of the first medium is completed after medium conveyance is resumed. The instruction not to stop medium conveyance is an instruction to continue medium conveyance without stopping medium conveyance when the conveyance of the first medium is completed after medium conveyance is resumed. When stopping medium conveyance again is designated in the selection field 602 of the notification screen 600, the reception unit 153 receives an instruction to stop medium conveyance again. By contrast, when not to stop medium conveyance again (to continue medium conveyance) is designated in the selection field 602 of the notification screen 600, the reception unit 153 receives an instruction not to stop medium conveyance.

When the reception unit 153 receives an instruction, the control unit 151 determines whether the reception unit 153 has received an instruction to resume medium conveyance or an instruction to cancel medium conveyance (step S108). When the reception unit 153 receives the instruction to resume medium conveyance, the control unit 151 returns the process to step S103 and again feeds and conveys the media placed again on the media table 103. In other words, the control unit 151 conveys again the medium which is determined as being multi-fed and placed again on the media table 103 by the user. Alternatively, the control unit 151 conveys again the medium determined as having an adhering object and is placed again on the media table 103 after the adhering object is removed or displaced by the user. By contrast, when the reception unit 153 receives the instruction to cancel medium conveyance, the control unit 151 ends the process without resuming medium conveyance.

By contrast, in step S104, when it is determined in the overlap determination process that no multi-feed of media has occurred and that the conveyed medium has no adhering object thereon, the control unit 151 determines whether the entire medium is imaged (step S109). For example, the control unit 151 determines whether the trailing end of the medium has passed the position of the second media sensor 115 based on the second media signal received from the second media sensor 115. The control unit 151 acquires the second media signal periodically from the second media sensor 115 and determines that the trailing end of the medium has passed the position of the second media sensor 115 when the signal value of the second media signal changes from a value indicating the presence of a medium to a value indicating the absence of a medium. The control unit 151 determines that the trailing end of the medium has passed the imaging position of the imaging device 119 and the entire medium has been imaged when a first predetermined time has elapsed from when the trailing end of the medium passed the position of the second media sensor 115. The predetermined time is set to the time for the medium to move from the position of the second media sensor 115 to the imaging position of the imaging device 119.

Alternatively, the control unit 151 may determine that the entire medium being conveyed has been imaged when a predetermined time has elapsed from the start of the feeding of the medium.

When the entire medium being conveyed has not yet been imaged, the control unit 151 returns the process to step S104 and repeats the process from step S104 to step S109.

By contrast, when the entire medium being conveyed has been imaged, the control unit 151 acquires the input image from the imaging device 119 and stores the acquired input image in the storage device 140. The control unit 151 transmits (i.e., outputs) the acquired input image to the information processing device via the interface device 132 (step S110).

Subsequently, the control unit 151 determines whether an instruction to resume medium conveyance and an instruction to stop medium conveyance again are received for the medium conveyed immediately before (step S111). When an instruction to resume medium conveyance and an instruction to stop medium conveyance again are received from the user for the medium conveyed immediately before, the medium conveyed immediately before is the medium with an adhering object, and the medium currently conveyed is a medium conveyed again with the adhering object removed or displaced by the user. If the instruction to resume medium conveyance or the instruction to stop medium conveyance again is not received for the medium conveyed immediately before, the control unit 151 proceeds to step S113 without performing any specific operation.

By contrast, when the instruction to resume medium conveyance or the instruction to stop medium conveyance again is received from the user for the medium conveyed immediately before, the control unit 151 stands by until the conveyance of the currently conveyed medium is completed. When the conveyance of the currently conveyed medium is completed, the control unit 151 stops the motor 131 to stop the feeding and conveying media again (step S112). The control unit 151 determines that the trailing end of the medium has passed the position of the eighth conveyance roller 117*h* and the conveyance of the medium is completed when a second predetermined time has elapsed from when the trailing end of the medium passed the position of the second media sensor 115. The second predetermined time is set to the time taken for the medium to move from the position of the second media sensor 115 to the position of the eighth conveyance roller 117*h*. The control unit 151 may determine that the conveyance of a medium is completed when a predetermined time elapses from the start of the feeding of the medium.

In this way, the control unit 151 stops feeding and conveying media again at the completion of the conveyance of the first medium after the conveyance of the subsequent medium is stopped based on the determination by the determination unit 152 that the medium has an adhering object thereon.

As described above, when the medium has an adhering object thereon, the user takes out the medium remaining in the medium conveyance passage, removes the adhering object from the medium or displaces the adhering object to an end portion of the medium, and then places the medium again on the media table 103. In other words, the first medium conveyed after the conveyance of the subsequent medium is stopped based on the determination by the determination unit 152 that the medium has an adhering object thereon is the medium from which the adhering object is removed or on which the adhering object is displaced by the user. When the conveyance of the medium from which the adhering object is removed or on which the adhering object is displaced by the user is completed, the control unit 151 stops medium conveyance again in order to allow the user to recover the state of the medium. As a result, the medium from which the adhering object is removed (or on which the adhering object is displaced) is placed at the top on the ejection table 104, and the user can re-attach the adhering object to (or returns the adhering object to the original position on) the medium at the top on the ejection table 104.

Further, when the user returns the medium to which the adhering object is re-attached or on which the adhering object is relocated on top of the media placed on the ejection table 104, the media collectively placed on the media table 103 and successively conveyed can be ejected onto the ejection table 104 in that order. This obviates the need for the user to find the medium with an adhering object from the media ejected onto the ejection table 104 and recover the state of the medium after all the media collectively placed on the media table 103 including the medium with an adhering object are successively conveyed. This enables the media conveying apparatus 100 to increase the convenience for the user.

In particular, the control unit 151 stops medium conveyance again only when an instruction to stop medium conveyance again is received from the user after the conveyance of the subsequent medium is stopped based on the determination by the determination unit 152 that the medium has an adhering object thereon. Accordingly, the media conveying apparatus 100 can prevent an increase of the time of the media reading process caused by stopping medium conveyance when it is not necessary for the user to return the state of the medium unlike the case where medium conveyance is stopped due to the occurrence of a multi-feed.

After that, the control unit 151 stands by until an operation signal instructing to resume the reading media is received from the operation device 105 or the interface device 132. The operation signal is output when the user inputs an instruction to resume the reading the media using the operation device 105 or the information processing device. The user re-attaches the adhering object to the medium or return the adhering object to its original position on the medium, returns the medium on top of the media on the ejection table 104, and then inputs the instruction to resume the reading of the media using the operation device 105 or the information processing device.

Subsequently, the control unit 151 determines whether a medium remains on the media table 103 based on the first media signal received from the first media sensor 111 (step S113). When a medium remains on the media table 103, the control unit 151 returns to step S104 and repeats the process from step S104 to step S113.

By contrast, when no medium remains on the media table 103, the control unit 151 stops the motor 131 to stop the pick roller 112, the feed roller 113, the separation roller 114, and the first to eighth conveyance rollers 117*a* to 117*h* (step S114) and ends the process.

In step S104, the control unit 151 may determine only whether it is determined that the medium has an adhering object thereon without determining whether it is determined that a multi-feed of media has occurred. Alternatively, when it is determined that a multi-feed of media has occurred in step S104, the control unit 151 may proceed to step S109 and continue medium conveyance without stopping medium conveyance.

Further, in step S107, the reception unit 153 may not receive an instruction to stop again or not to stop medium conveyance in a case where the reception unit 153 receives an instruction to resume medium conveyance from the user. In this case, in step S112, the control unit 151 stops medium conveyance again irrespective of the instruction from the users at the completion of the conveyance of the first medium after the conveyance of the subsequent medium is stopped based on the determination by the determination unit 152 that the medium has an adhering object thereon.

Figure 7:
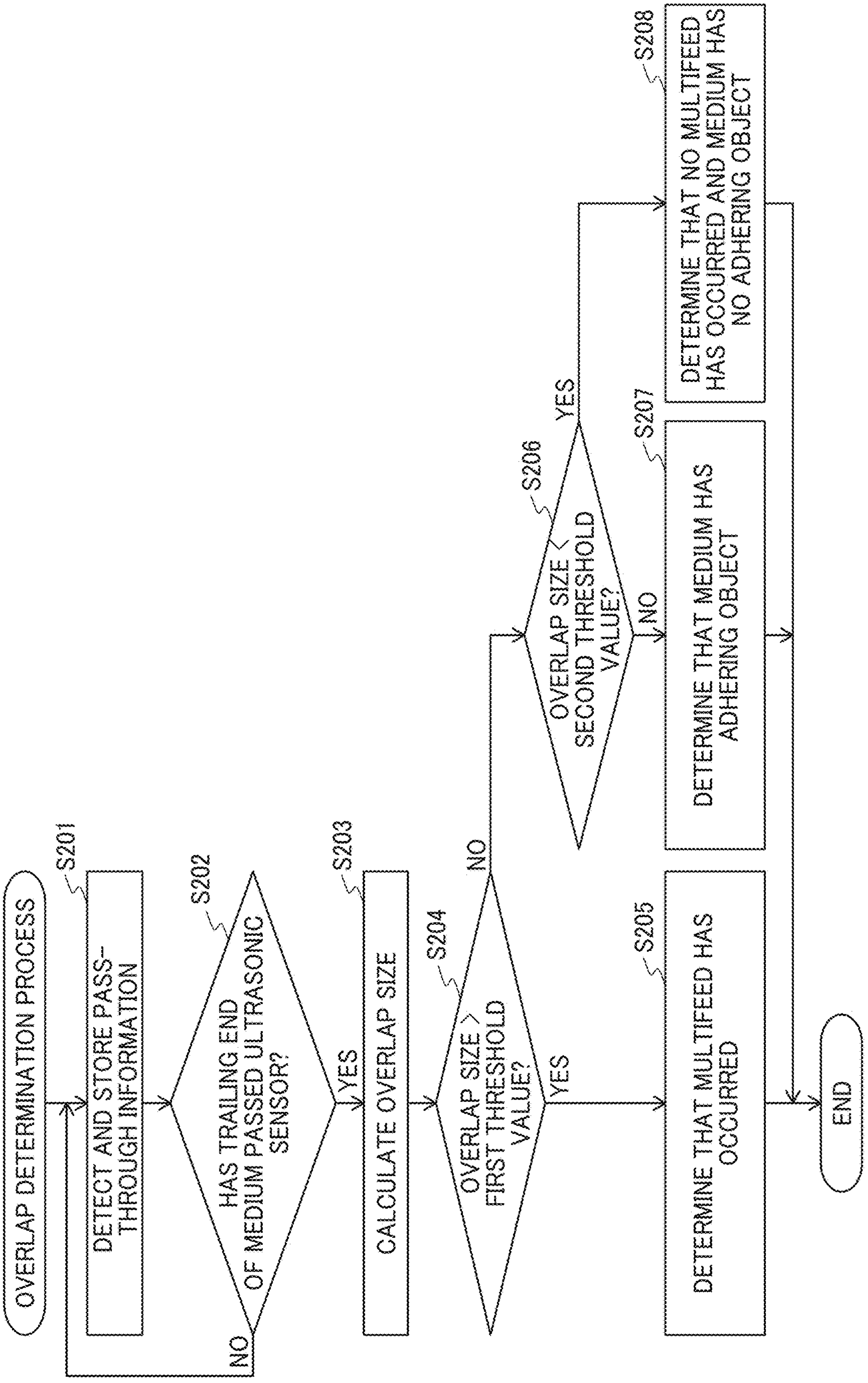
FIG. 7 is a flowchart of example operations in an overlap determination process.

FIG. 7 is a flowchart of example operations in the overlap determination process may be performed by the media conveying apparatus 100.

A description of the overlap determination process performed by the media conveying apparatus 100 is given below with reference to the flowchart of FIG. 7. The sequence of operations described below is executed, for example, by the processing circuit 150 in cooperation with the components of the media conveying apparatus 100 based on the programs prestored in the storage device 140. The sequence of operations illustrated in FIG. 7 is executed every time a medium is conveyed.

First, the determination unit 152 receives an ultrasonic signal from the ultrasonic sensor 116. The determination unit 152 detects the pass-through information indicated by the received ultrasonic signal as the pass-through information of the ultrasonic waves passed through the medium at multiple positions of the medium conveyed by the conveyor, and stores the pass-through information in the storage device 140 in association with the current time (step S201).

Subsequently, the determination unit 152 determines whether the trailing end of the medium has passed the position of the ultrasonic sensor 116 (step S202). The determination unit 152 determines that the trailing end of the medium has passed the position of the ultrasonic sensor 116 when a third predetermined time has elapsed from when the trailing end of the medium passed the position of the second media sensor 115. The third predetermined time is set to the time taken for the medium to move from the position of the second media sensor 115 to the position of the ultrasonic sensor 116. Alternatively, the determination unit 152 may determine that the trailing end of the medium has passed the position of the ultrasonic sensor 116 after the elapse of a predetermined time from the start of the feeding of the medium. When the trailing end of the medium has not yet passed the position of the ultrasonic sensor 116, the determination unit 152 returns the process to step S201 and repeats the process from step S201 to step S202.

By contrast, when the trailing end of the medium has passed the position of the ultrasonic sensor 116, the determination unit 152 calculates the size of the region in which the pass-through information detected by the ultrasonic sensor 116 is within a predetermined range as the size of an overlap in the medium being conveyed, that is, an overlap area where an overlap occurs between media or an adhering object is present (step S203). At the position where the medium is overlapped, the ultrasonic waves transmitted by the ultrasonic sensor 116 are attenuated by an air layer between media or between an adhering object and a medium, and thus the pass-through information (indicating the magnitude of the ultrasonic waves) decreases. The determination unit 152 determines that the medium is overlapped at the position where the calculated value based on the pass-through information is less than a multi-feed threshold value. The determination unit 152 calculates a statistical value (an average value, a median value, a maximum value, or a minimum value) of the pass-through information detected within a predetermined period before and after each pass-through information is detected as the calculated value. The determination unit 152 may use each pass-through information itself as the calculated value. The multi-feed threshold is set to, for example, a value between the pass-through information detected when one plain paper copier (PPC) sheet is conveyed and the pass-through information detected when two PPC sheets are conveyed. The determination unit 152 refers to the pass-through information stored in the storage device 140 and calculates the overlap size by multiplying the maximum continuous period during which the calculated value is continuously less than the multi-feed threshold value by the conveyance speed of the medium.

When multiple ultrasonic sensors 116 are used, the determination unit 152 calculates the overlap size in the medium conveyance direction A2 for each ultrasonic sensor 116. The determination unit 152 may calculate the size of overlap of media in the width direction A4 in addition to or instead of the size of overlap of media in the medium conveyance direction A2 as the overlap size. In this case, the determination unit 152 calculates the overlap size in the width direction A4 from the position of the ultrasonic sensor 116 that outputs the pass-through information less than the multi-feed threshold value.

In addition, in a case where an interval between two of the continuous periods during which the calculated value is continuously less than the multi-feed threshold value is equal to or less than a predetermined interval, the determination unit 152 may determine that the two continuous periods are continuous with one other. In this manner, the determination unit 152 can reduce the influence of noise and calculate the overlap size with higher accuracy.

Subsequently, the determination unit 152 determines whether the calculated overlap size is larger than a first threshold value (step S204). The first threshold value is set to a value (for example, 80 mm) obtained by adding a margin to the maximum size of typical sticky notes.

If the overlap size is larger than the first threshold value (Yes in step S204), the determination unit 152 determines that a multi-feed of media has occurred (step S205), and ends the process.

By contrast, when the overlap size is equal to or less than the first threshold value (No in step S204), the determination unit 152 determines whether the overlap size calculated by the determination unit 152 is less than a second threshold value (step S206). The second threshold value is set to a value smaller than the first threshold value. For example, the threshold value is set to a value (for example, 5 mm) obtained by subtracting a margin from the minimum size of typical sticky notes.

When the overlap size is equal to or larger than the second threshold value, that is, the overlap size is equal to or less than the first threshold value and equal to or larger than the second threshold value, the determination unit 152 determines that the conveyed medium has an adhering object thereon (step S207) and ends the process.

By contrast, when the overlap size is less than the second threshold value, the determination unit 152 determines that no multi-feed of media has occurred and the conveyed medium has no adhering object thereon (step S208) and ends the process.

In this way, the determination unit 152 determines whether the medium has an adhering object thereon based on the pass-through information of the ultrasonic waves penetrating the conveyed medium. As a result, the determination unit 152 can accurately determine whether the medium has an adhering object thereon. In particular, even when the calculated value is less than the multi-feed threshold value, the determination unit 152 determines that the conveyed medium has an adhering object thereon but no multi-feed of media has occurred in a case where the overlap size is equal to or less than the first threshold value. This can prevent the determination unit 152 from erroneously determining that a multi-feed of media has occurred when a medium having a small adhering medium thereon is conveyed.

Note that the pass-through information may indicate the magnitude of the phase shift in the ultrasonic waves received by the ultrasonic receiver 116*b* with respect to the phases of the ultrasonic waves transmitted by the ultrasonic transmitter 116*a*, instead of the magnitudes of the ultrasonic waves received by the ultrasonic receiver 116*b*. When media overlap, the phase shift in the ultrasonic waves passing through the media is larger compared with a case where media do not overlap. Therefore, the determination unit 152 determines that the medium is overlapped at the position where the calculated value based on the pass-through information is larger than the multi-feed threshold value.

The determination unit 152 may determine whether the medium has an adhering object thereon based on only the magnitude of the pass-through information without using the overlap size. For example, when a position at which the calculated value based on the pass-through information is less than the multi-feed threshold value is present in the medium, the determination unit 152 determines that a multi-feed of media has occurred and that the medium has an adhering object thereon. The determination unit 152 can determine whether a multi-feed of media has occurred and whether the medium has an adhering object thereon with a lower processing load by using only the magnitude of the pass-through information. By contrast, the determination unit 152 can more accurately determine whether a multi-feed of media has occurred and whether the medium has an adhering object thereon by using the overlap size.

As described above in detail, the media conveying apparatus 100 stops medium conveyance when the conveyed medium has an adhering object thereon. After that, when the medium from which the adhering object is removed or when the medium on which the adhering object is displaced is conveyed again, the media conveying apparatus 100 stops again (suspends) medium conveyance to allow the user to re-attach the adhering object or return the adhering object to the original position. As a result, in a case where the conveyed medium has an adhering object thereon, the user can easily remove or displace the adhering object and easily return the state of the adhering object after the medium is conveyed again. Therefore, the media conveying apparatus 100 can increase the convenience for the user when the conveyed medium has an adhering object thereon.

Figure 8:
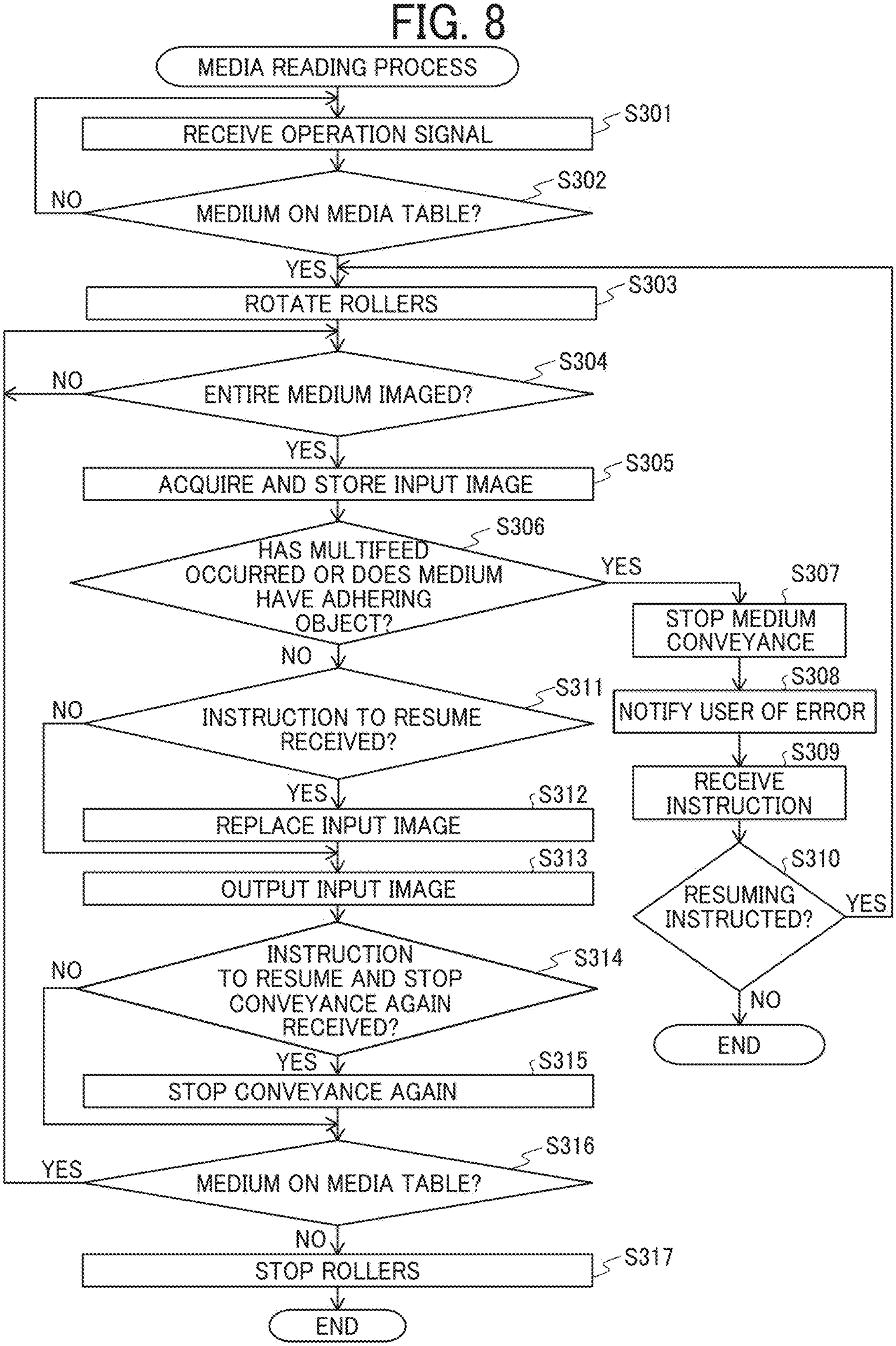
FIG. 8 is a flowchart of example operations in another media reading process.

FIG. 8 is a flowchart illustrating example operations in a media reading process according to another embodiment.

The process in FIG. 8 is executed instead of the process in the flowchart of FIG. 5. The operations in steps S301 to S303, S304, S306 to S310, and S314 to S317 in FIG. 8 are similar to the operations in steps S101 to S103, S109, S104 to S108, and S111 to S114 in FIG. 5. However, the operations in steps from S306 to S310 are executed after it is determined that the entire medium has been imaged in step S304.

When it is determined in step S304 that the entire medium has been imaged, the control unit 151 acquires the input image from the imaging device 119 and stores the acquired input image in the storage device 140 (step S305).

In a case where it is determined that no multi-feed of media has occurred and that the conveyed medium has no adhering object thereon in the overlap determination process in step S306, the control unit 151 determines whether an instruction to resume medium conveyance is received (step S311). The control unit 151 determines whether the medium conveyed immediately before the medium currently being conveyed was stopped due to the occurrence of a multi-feed of media or an adhering object and the reception unit 153 has received an instruction to resume medium conveyance from the user.

When the instruction to resume medium conveyance is received, the control unit 151 replaces the input image obtained by imaging the medium conveyed immediately before with the input image obtained by imaging the medium currently conveyed (step S312). The control unit 151 deletes the input image obtained by imaging the medium conveyed immediately before from the storage device 140 and stores the input image obtained by imaging the medium currently conveyed. In other words, when the determination unit 152 determines that the medium has an adhering object thereon, the control unit 151 replaces the image obtained by imaging that medium with the image obtained by imaging the first medium conveyed after medium conveyance is stopped. As a result, the control unit 151 can replace the input image in which a character or figure printed on the medium is covered with the adhering object with the input image in which no character or figure is covered due to removal or displacement of the adhering object. Accordingly, the media conveying apparatus 100 can provide an appropriate input image to the user.

In step S313, the control unit 151 transmits (i.e., outputs) the acquired input image to the information processing device via the interface device 132.

As described above in detail, the media conveying apparatus 100 can increase the convenience for the user when the conveyed medium has an adhering object thereon even when the determination on whether the medium has an adhering object thereon is made after the entire medium is imaged.

Figure 9:
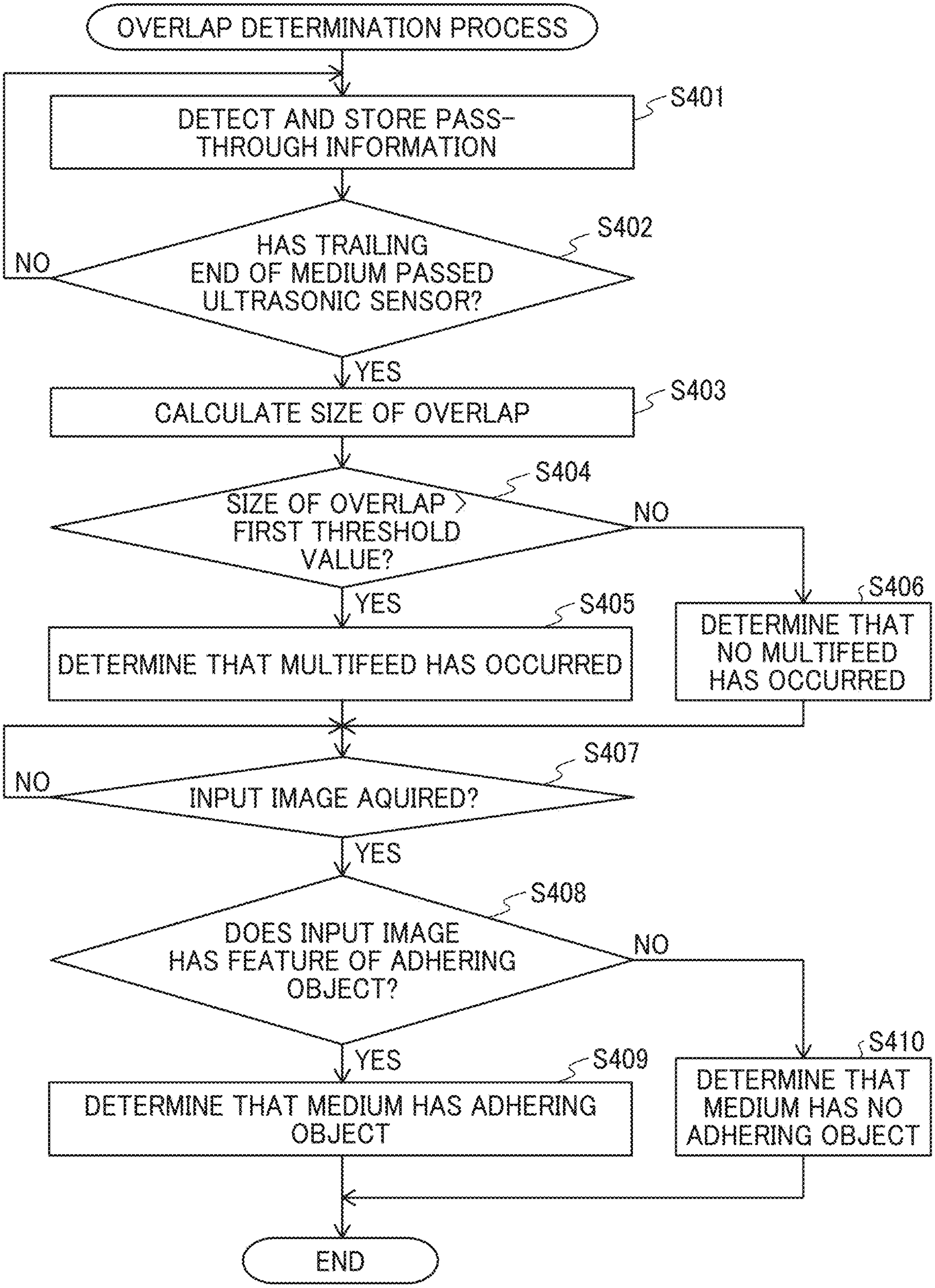
FIG. 9 is a flowchart of example operations in another overlap determination process.

FIG. 9 is a flowchart of example operations in an overlap determination process according to another embodiment.

The process in FIG. 9 is executed instead of the process in the flowchart of FIG. 7. The process in FIG. 9 is executed in combination with the media reading process illustrated in FIG. 8. The overlap determination process executed in combination with the media reading process illustrated in FIG. 8 is not limited to the overlap determination process illustrated in FIG. 9 and may be the overlap determination process illustrated in FIG. 7. Since the operations in steps S401 to S404 in FIG. 9 are similar to the operations in steps in S201 to S204 in FIG. 7, only the operations in steps S405 to S410 will be described below.

In step S404, when the overlap size is larger than the first threshold value, the determination unit 152 determines that a multi-feed of media has occurred (step S405).

By contrast, when the overlap size is equal to or less than the first threshold value, the determination unit 152 determines that no multi-feed of media has occurred (step S406).

Subsequently, the determination unit 152 stands by until the control unit 151 acquires an input image from the imaging device 119 (step S407).

Subsequently, the determination unit 152 determines whether the acquired input image has the feature of an adhering object (step S408). In the media conveying apparatus 100, for example, image patterns of various types of adhering objects are prestored in the storage device 140. The determination unit 152 crops a region having the same size as the image pattern prestored in the storage device 140 from the input image as a cropped image while shifting the position on the input image, and calculates the degrees of similarity between each cropped image and each image pattern. The degree of similarity is a normalized cross-correlation value. The degree of similarity may be the reciprocal of the sum of square d difference (SSD) or the reciprocal of the sum of absolute difference (SAD). The determination unit 152 determines that the input image has the feature of the adhering object when the maximum value of the degrees of similarity between each cropped image and each image pattern is equal to or larger than a similarity threshold value. By contrast, when the maximum value of the degrees of similarity between each cropped image and each image pattern is less than the similarity threshold value, the determination unit 152 determines that the input image does not have the feature of the adhering object.

In the media conveying apparatus 100, one or more sizes, shapes, and colors of typical adhering objects may be prestored in the storage device 140 as the features of the adhering objects. In this case, the determination unit 152 generates a cropped image by cropping a region having the same size and the same shape as those prestored in the storage device 140 from the input image while shifting the position of the region. The determination unit 152 calculates, for each generated cropped image, the difference between the pixel value (a brightness value or a color value) of each pixel in the cropped image and the pixel value of each color prestored in the storage device 140. The determination unit 152 calculates, as an evaluation value, the number of pixels having the calculated difference equal to or less than a threshold pixel value or the ratio of the number of pixels having the calculated difference equal to or less than the threshold pixel value to the total number of pixels in the cropped image. The determination unit 152 determines that the input image has the feature of the adhering object when the maximum value of the calculated evaluation values is equal to or larger than a threshold value. The determination unit 152 determines that the input image does not have the feature of the adhering object when the maximum value of the calculated evaluation values is less than the threshold value.

When the input image has the feature of the adhering object, the determination unit 152 determines that the conveyed medium has an adhering object thereon (step S409), and ends the process.

By contrast, when the input image does not have the feature of the adhering object, the determination unit 152 determines that the conveyed medium has no adhering object thereon (step S410), and ends the process.

In this way, the determination unit 152 determines whether the medium has an adhering object thereon based on the image obtained by imaging the conveyed medium. The determination unit 152 can more accurately determine whether the medium has an adhering object thereon by using the image obtained by imaging the conveyed medium.

The determination unit 152 may determine whether the medium has an adhering object thereon based on both the pass-through information and the input image. For example, the determination unit 152 determines that the medium has an adhering object thereon only when both the determination based on the pass-through information and the determination based on the input image indicate that the medium has an adhering object thereon. Alternatively, the determination unit 152 may determine that the medium has an adhering object thereon when one of determination based on the pass-through information and determination based on the input image indicates that the medium has an adhering object thereon. The determination unit 152 can more accurately determine whether the medium has an adhering object thereon by using both the pass-through information and the input image.

As described above in detail, the media conveying apparatus 100 can increase the convenience for the user when the conveyed medium has an adhering object thereon even when the determination on whether the medium has an adhering object thereon is made based on the input image.

Figure 10:
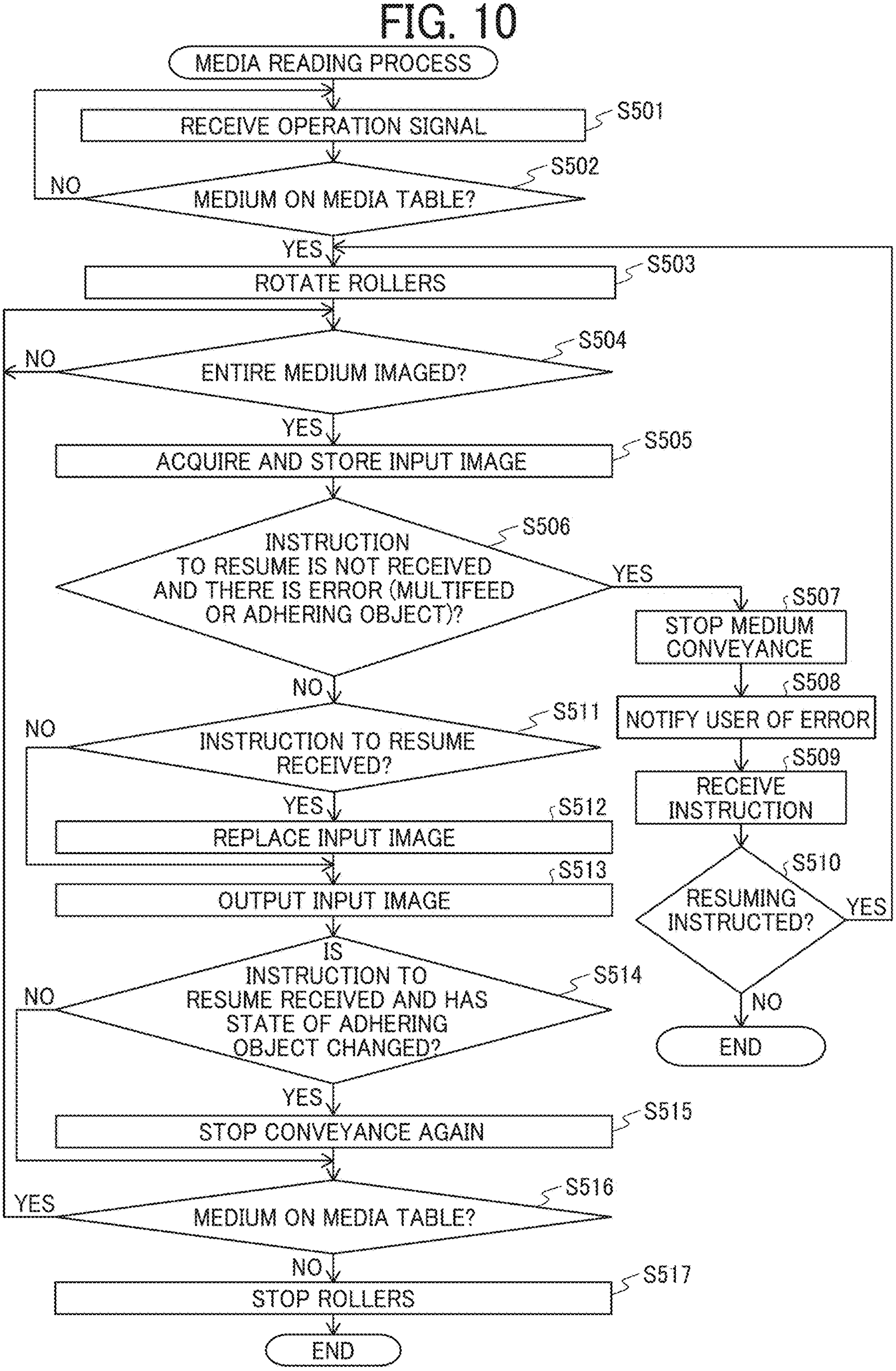
FIG. 10 is a flowchart of example operations in another media reading process.

FIG. 10 is a flowchart illustrating example operations in a media reading process according to another embodiment. The process in FIG. 10 is executed instead of the process in the flowchart of FIG. 8. Since the operations in steps S501 to S505, S507 to S513, and S516 to S517 in FIG. 10 are similar to the operations in steps S301 to S305, S307 to S313, and S316 to S317 in FIG. 8, only the operations in steps S506, S514 to S515 will be described below.

In step S506, the control unit 151 determines whether an instruction to resume medium conveyance is received from the user for the medium conveyed immediately before. When the instruction to resume medium conveyance is not received from the user for the medium conveyed immediately before, the control unit 151 determines whether it is determined that an error (a multi-feed of media or an adhering object on the conveyed medium) has occurred. By contrast, when the instruction to resume medium conveyance is received from the user for the medium conveyed immediately before, the control unit 151 proceeds the process to step S507 without determining whether a multi-feed of media has occurred and whether the conveyed medium has an adhering object thereon.

In step S514, the control unit 151 determines whether an instruction to resume medium conveyance is received from the user for the medium conveyed immediately before, and whether the state of the adhering object has changed between the medium conveyed immediately before and the medium currently being conveyed (step S514). When an instruction to resume medium conveyance is received from the user for the medium conveyed immediately before, the medium conveyed immediately before is the medium multi-fed or the medium having an adhering object thereon. When the state of the adhering object has changed between the medium conveyed immediately before and the medium currently conveyed, the medium currently conveyed is a medium that is conveyed again after the adhering object is removed or displaced by the user.

The control unit 151 determines whether the currently conveyed medium has an adhering object thereon in a manner similar to the process of steps S201 to S207 of FIG. 7 or the process of steps S408 to S410 of FIG. 9. When the medium currently conveyed has no adhering object thereon, the control unit 151 determines that the adhering object is removed from the medium currently conveyed and the state of the adhering object has changed between the medium conveyed immediately before and the medium currently conveyed.

When determining that the medium has an adhering object thereon in step S207 of FIG. 7, the determination unit 152 stores the position of the region in the medium where the pass-through information is within the predetermined range (the region where the medium is overlapped) in the storage device 140 as the overlapping position. Similarly, when determining that the medium currently conveyed has an adhering object thereon, the determination unit 152 detects the position of the region in the medium where the pass-through information is within the predetermined range (the region where the medium is overlapped) as the overlapping position. When the overlapping position is different between the medium conveyed immediately before and the medium currently conveyed, the control unit 151 determines that the position of the adhering object is displaced on the medium currently conveyed and the state of the adhering object is changed between the medium conveyed immediately before and the medium currently conveyed. By contrast, when the overlapping position is consistent between the medium conveyed immediately before and the medium currently conveyed, the control unit 151 determines that the state of the adhering object has not changed between the medium conveyed immediately before and the medium currently conveyed.

By contrast, when determining that the medium has an adhering object thereon in step S409 of FIG. 9, the determination unit 152 stores the position of the region in the input image where the cropped image has the maximum degree of similarity to the image pattern or has the maximum evaluation value as the overlapping position in the storage device 140. Similarly, when determining that the currently conveyed medium has an adhering object thereon, the determination unit 152 detects the position of the region in the input image where the cropped image has the maximum degree of similarity to the image pattern or has the maximum evaluation value as the overlapping position. When the overlapping position is different between the medium conveyed immediately before and the medium currently conveyed, the control unit 151 determines that the position of the adhering object is displaced on the medium currently conveyed and the state of the adhering object is changed between the medium conveyed immediately before and the medium currently conveyed. By contrast, when the overlapping position is consistent between the medium conveyed immediately before and the medium currently conveyed, the control unit 151 determines that the state of the adhering object has not changed between the medium conveyed immediately before and the medium currently conveyed.

The control unit 151 may determine whether the state of the adhering object has changed by determining only one of whether the adhering object is removed from the medium currently conveyed and whether the position of the adhering object is displaced.

When the control unit 151 has not received an instruction to resume medium conveyance from the user for the medium conveyed immediately before, or when the state of the adhering object has not changed between the medium conveyed immediately before and the medium currently being conveyed, the control unit 151 proceeds to step S516 without performing any specific operation.

By contrast, when the instruction to resume medium conveyance has been received from the user for the medium conveyed immediately before and the state of the adhering object has changed between the medium conveyed immediately before and the medium being currently conveyed, the control unit 151 stands by until the conveyance of the currently conveyed medium is completed. When the conveyance of the medium is completed, the control unit 151 stops the motor 131 and stops feeding and conveying media again (step S515).

In this way, at the completion of the conveyance of the first medium after medium conveyance is stopped based on the determination that the medium has an adhering object thereon, the control unit 151 stops medium conveyance again only when the first medium has no adhering object thereon. Alternatively, at the completion of the conveyance of the first medium after medium conveyance is stopped based on the determination that the medium has an adhering object thereon, the control unit 151 stops medium conveyance again only when the adhering object is displaced. Thus, the media conveying apparatus 100 does not stop medium conveyance when the user does not need to re-attach the adhering object to the medium or does not need to return the adhering object to the original position. Accordingly, the convenience for the user can increase.

As described above in detail, the media conveying apparatus 100 can further increase the convenience for the user when the conveyed medium has an adhering object thereon by stopping medium conveyance again only when the state of the adhering object is changed on the medium conveyed again.

Figure 11:
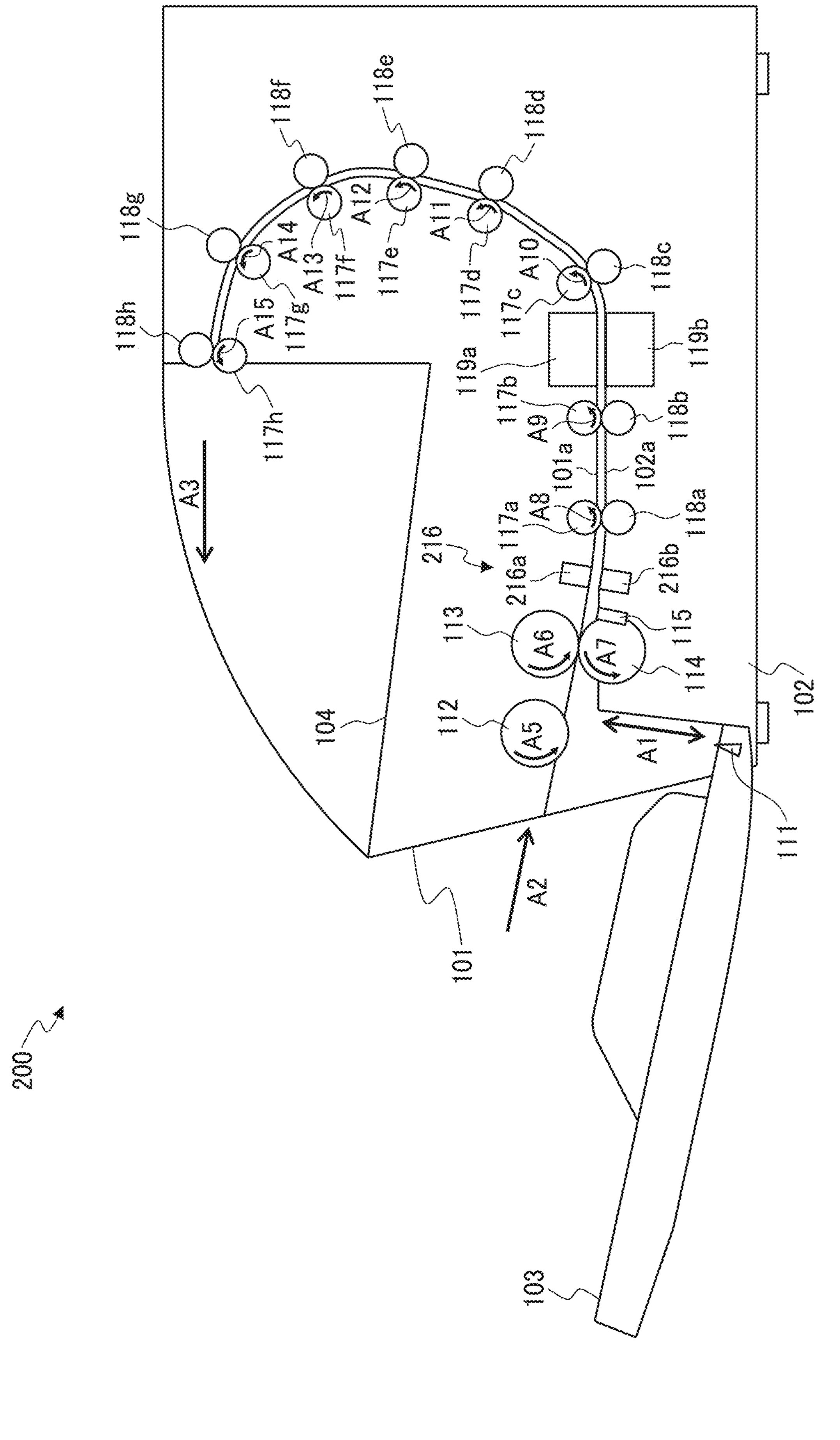
FIG. 11 is a diagram illustrating a medium conveyance passage inside a media conveying apparatus according to another embodiment.

FIG. 11 is a diagram illustrating a conveyance passage inside a media conveying apparatus 200 according to another embodiment.

As illustrated in FIG. 11, the media conveying apparatus 200 includes the components included in the media conveying apparatus 100. However, the media conveying apparatus 200 includes a thickness sensor 216 instead of the ultrasonic sensor 116.

The thickness sensor 216 is disposed downstream from the feed roller 113 and the separation roller 114 and upstream from the first to eighth conveyance rollers **117*a* to 117*h* and the first to eighth driven rollers 118*a* to 118*h*. The thickness sensor 216 includes a light emitter 216*a* and a light receiver 216*b*. The light emitter 216*a* and the light receiver 216*b* are disposed in the vicinity of the medium conveyance passage to face each other across the medium conveyance passage. The light emitter 216*a* emits light (infrared light or visible light) toward the light receiver 216*b*. The light receiver 216*b* receives the light from the light emitter 216*a*, generates a thickness signal which is an electrical signal corresponding to the intensity of the received light, and outputs the thickness signal. When a medium is present at the position of the thickness sensor 216, the light emitted by the light emitter 216*a* is attenuated by the medium. The greater the thickness of the medium, the greater the attenuation. For example, the thickness sensor 216 generates the thickness signal such that the signal value increases as the thickness of the medium increases. The thickness signal indicates thickness information of the medium at multiple positions on the medium conveyed by the conveyor. The number of the thickness sensor 216 is not limited to one, and may be two or more. In this case, the multiple thickness sensors 216 are arranged side by side at intervals in the width direction A4**.

The thickness sensor 216 may be a reflected light sensor, a pressure sensor, or a mechanical sensor. The reflected light sensor includes one set of a light emitter and a light receiver (referred to as the emitter-receiver set in the following description) disposed on one side of the medium conveyance passage and another emitter-receiver set disposed on the other side of the medium conveyance passage. The reflected light sensor detects the respective distances between the emitter-receiver sets and the corresponding sides of the medium based on the time from when one emitter-receiver set emits light to the corresponding side of the medium to when the set receives the reflected light and the time from when another emitter-receiver set emits light to the corresponding side of the medium to when the set receives the reflected light. The reflected light sensor generates a thickness signal indicating, as thickness information, a value obtained by subtracting each detected distance from the distance between the two emitter-receiver sets. The pressure sensor detects a pressure that changes in accordance with the thickness of the medium, and generates a thickness signal indicating the detected pressure as thickness information. The mechanical sensor detects the amount of movement of a roller in contact with the medium and generates a thickness signal indicating the detected amount of movement as thickness information.

The media conveying apparatus 200 executes the media reading process illustrated in FIG. 5, 8, or 10 and the overlap determination process illustrated in FIG. 7 or 9, similarly to the media conveying apparatus 100.

However, in step S201 of FIG. 7 or step S401 of FIG. 9, the determination unit 152 receives the thickness signal from the thickness sensor 216. The determination unit 152 detects the thickness information indicated by the received thickness signal as the thickness information of the medium at multiple positions of the medium conveyed by the conveyor, and stores the thickness information in the storage device 140 in association with the current time.

In step S202 of FIG. 7 or step S402 of FIG. 9, the determination unit 152 determines whether the trailing end of the medium has passed the position of the thickness sensor 216. When the trailing end of the medium has not yet passed the position of the thickness sensor 216, the determination unit 152 returns the process to step S201 or S401, and repeats the process of steps S201 to S202 or S401 to S402.

Further, in step S203 of FIG. 7 or step S403 of FIG. 9, the determination unit 152 calculates the size of the region in which the detected thicknesses information is within a predetermined range in the conveyed medium as the overlap size. The determination unit 152 determines that the medium is overlapped at the position where the thickness information is larger than the multi-feed threshold value. The determination unit 152 calculates, as the calculated value, a statistical value (an average value, a median value, a maximum value, or a minimum value) of the thickness information detected within a predetermined period before and after each thickness information is detected. The determination unit 152 may use each thickness information itself as the calculated value. The multi-feed threshold value is set to a value between the thickness information detected when one PPC sheet is conveyed and the thickness information detected when two PPC sheets are conveyed. The determination unit 152 refers to the thickness information stored in the storage device 140 and calculates the overlap size by multiplying the maximum continuous period during which the calculated value is continuously larger than the multi-feed threshold value by the conveyance speed of the medium.

When multiple thickness sensors 216 are used, the determination unit 152 calculates the overlap size in the medium conveyance direction A2 for each thickness sensor 216. The determination unit 152 may calculate the size of overlap of media in the width direction A4 in addition to or instead of the size of overlap of media in the medium conveyance direction A2 as the overlap size. In this case, the determination unit 152 calculates the overlap size in the width direction A4 from the position of the thickness sensor 216 that has output the thickness information larger than the multi-feed threshold value.

In this way, the determination unit 152 determines whether the medium has an adhering object thereon based on the thickness information of the conveyed medium. As a result, the determination unit 152 can accurately determine whether the medium has an adhering object thereon. In particular, even when the calculated value is larger than the multi-feed threshold value, the determination unit 152 determines that the conveyed medium has an adhering object thereon but no multi-feed of media has occurred in a case where the overlap size is equal to or less than the first threshold value. This can prevent the determination unit 152 from erroneously determining that a multi-feed of media has occurred when a medium having a small adhering medium thereon is conveyed.

The determination unit 152 may determine whether the medium has an adhering object thereon based on only the magnitude of the thickness information without using the overlap size. For example, when a position at which the calculated value based on the thickness information is larger than the multi-feed threshold value is present in the medium, the determination unit 152 determines that a multi-feed of media has occurred and that the medium has an adhering object thereon. The determination unit 152 can determine whether the medium has an adhering object thereon with a lower processing load by using only the magnitude of the thickness information. By contrast, the determination unit 152 can more accurately determine whether the medium has an adhering object thereon by using the overlap size.

The determination unit 152 may determine whether the medium has an adhering object thereon based on both the thickness information and the input image. For example, the determination unit 152 determines that the medium has an adhering object thereon only when both the determination based on the thickness information and the determination based on the input image indicate that the medium has an adhering object thereon. Alternatively, the determination unit 152 may determine that the medium has an adhering object thereon when one of the determination based on the thickness information and the determination based on the input image indicates that the medium has an adhering object. The determination unit 152 can more accurately determine whether the medium has an adhering object thereon by using both the thickness information and the input image.

As described above in detail, the media conveying apparatus 200 can increase the convenience for the user when the conveyed medium has an adhering object thereon even when the determination on whether the medium has an adhering object thereon is made based on the thickness information of the conveyed medium.

Figure 12:
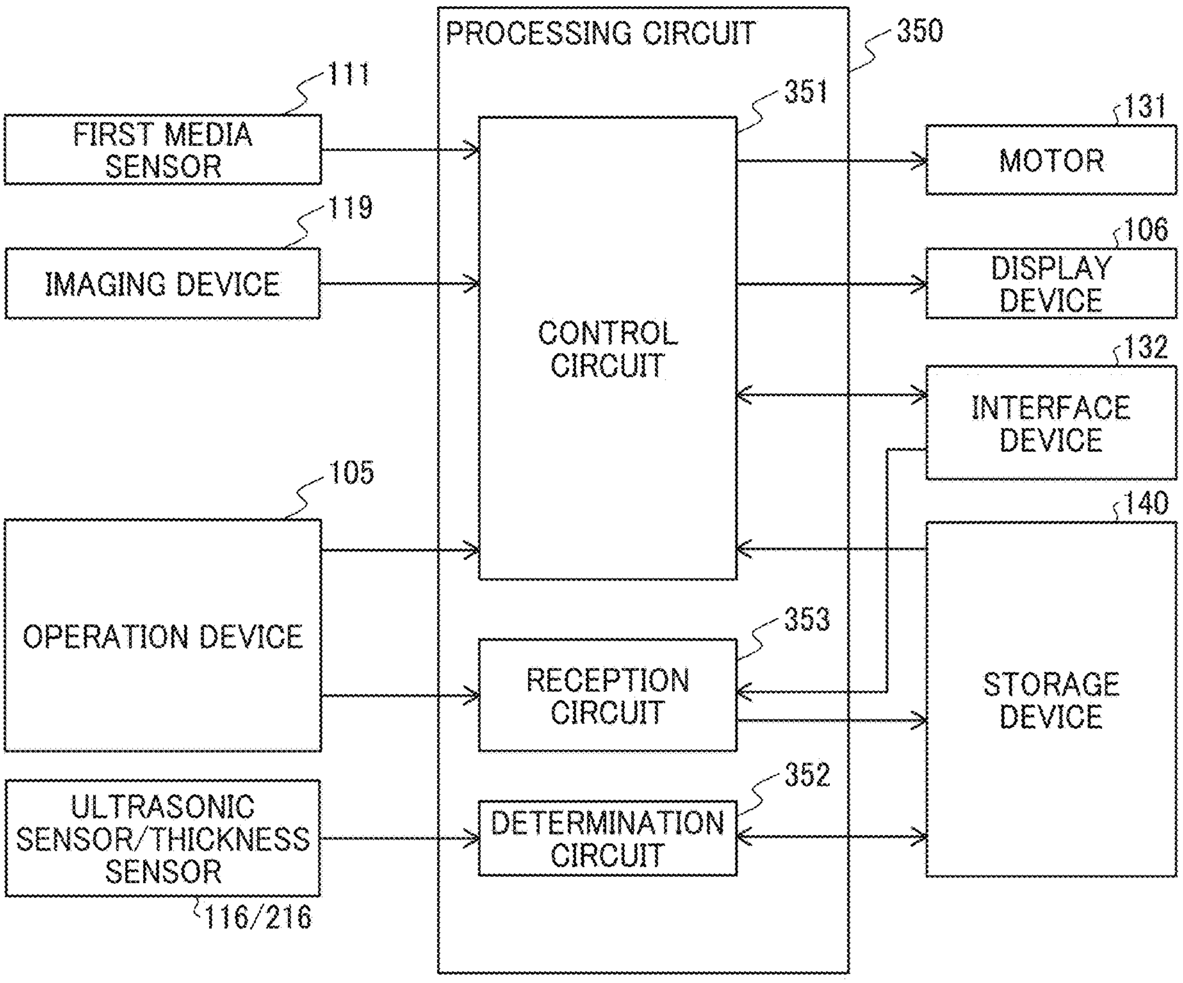
FIG. 12 is a schematic block diagram illustrating a configuration of a processing circuit of a media conveying apparatus according to another embodiment.

FIG. 12 is a schematic block diagram illustrating a configuration of a processing circuit 350 of a media conveying apparatus according to another embodiment.

The processing circuit 350 is used instead of the processing circuit 150 and executes the media reading process and the overlap determination process instead of the processing circuit 150. The processing circuit 350 includes a control circuit 351, a determination circuit 352, a reception circuit 353, etc. These circuits may be implemented by independent integrated circuits, microprocessors, or firmware, or a combination thereof.

The control circuit 351 is one example of a control unit and functions like the control unit 151. The control circuit 351 receives an operation signal from the operation device 105 or the interface device 132 and a first media signal from the first media sensor 111, and controls the motor 131 to convey the medium according to the received signals. The control circuit 351 acquires an input image from the imaging device 119 and outputs the input image to the interface device 132. The control circuit 351 reads the determination result indicating whether the medium has an adhering object thereon or the instruction to stop medium conveyance again from the storage device 140, and stops medium conveyance or stops medium conveyance again based on the read information.

The determination circuit 352 is one example of a determination unit and functions like the determination unit 152. The determination circuit 352 receives an ultrasonic signal from the ultrasonic sensor 116 or a thickness signal from the thickness sensor 216, or reads an input image from the storage device 140. The determination circuit 352 determines whether the medium has an adhering object thereon based on the received signal or the read input image, and stores the determination result in the storage device 140.

The reception circuit 353 is one example of a reception unit and functions like the reception unit 153. The reception circuit 353 receives an instruction to stop medium conveyance again from the operation device 105 or the interface device 132, and stores the instruction in the storage device 140.

As described above in detail, the media conveying apparatus can increase the convenience for the user when the conveyed medium has an adhering object thereon even when the processing circuit 350 executes the media reading process and the overlap determination process.

Although the preferred embodiments have been described above, the embodiments are not limited thereto. For example, in step S312 of FIG. 8 or step S512 of FIG. 10, the control unit 151 may replace only the region covered with the adhering object in the input image instead of replacing the entire input image. In this case, when determining that the medium has an adhering object thereon in step S409 of FIG. 9, the determination unit 152 stores, in the storage device 140, the position of the region (i.e., an overlapping region) in the input image where the cropped image whose degree of similarity to the image pattern or the evaluation value is equal to or larger than the threshold is cropped as the overlapping position. The control unit 151 substitutes the pixel value of each pixel in the overlapping region in the input image obtained by imaging the medium conveyed immediately before with the pixel value of the corresponding pixel in the input image obtained by imaging the medium currently conveyed, thereby replacing the region covered with the adhering object in the input image. Also in this case, the control unit 151 can replace the input image in which a character or figure printed on the medium is covered with the adhering object with the input image in which such a character or figure is not covered due to removal or displacement of the adhering object. Therefore, the media conveying apparatus can provide an appropriate input image to the user.

The technical scope of the present disclosure is not limited to the embodiments described above and covers equivalents of elements described above. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. A media conveying apparatus comprising:
- a conveyor to convey a medium;
- an imager to image the conveyed medium to obtain an image; and
- circuitry configured to:
  - determine whether the conveyed medium has an adhering object;
  - control the conveyor to stop conveyance of a subsequent medium following the conveyed medium based on a determination result indicating that the conveyed medium has an adhering object;
  - control the conveyor to resume medium conveyance according to a received instruction to resume medium conveyance; and
  - in response to completion of conveyance of a first medium that is firstly conveyed after medium conveyance is resumed, control the conveyor to stop medium conveyance again based on a determination result indicating that the adhering object is not on the first medium or the adhering object is displaced on the first medium.

2. The media conveying apparatus according to claim 1, wherein the circuitry is configured to determine whether the conveyed medium has an adhering object based on pass-through information of an ultrasonic wave passing through the conveyed medium or thickness information of the conveyed medium.

3. The media conveying apparatus according to claim 1, wherein the circuitry is configured to determine whether the conveyed medium has an adhering object based on the image.

4. The media conveying apparatus according to claim 1, wherein the circuitry is configured to control the conveyor to stop medium conveyance again based on a received instruction.

5. The media conveying apparatus according to claim 1, wherein the circuitry is configured to replace, based on the determination result, the image obtained from the conveyed medium determined as having the adhering object with an image obtained by imaging the first medium conveyed.

6. The media conveying apparatus according to claim 1, wherein the circuitry is configured to, based on the determination result, stop the conveyance of the subsequent medium by controlling the conveyor to stop the conveyance of the conveyed medium determined as having the adhering object.

7. A method of controlling a media conveying apparatus, the method comprising:

conveying a medium with a conveyor;

imaging the conveyed medium with an imager to obtain an image;

determining whether the conveyed medium has an adhering object;

controlling the conveyor to stop conveyance of a subsequent medium following the conveyed medium based on a determination result indicating that the conveyed medium has an adhering object;

controlling the conveyor to resume medium conveyance according to a received instruction to resume medium conveyance; and in response to completion of conveyance of a first medium that is firstly conveyed after medium conveyance is resumed, controlling the conveyor to stop medium conveyance again based on a determination result indicating that the adhering object is not on the first medium or the adhering object is displaced on the first medium.

8. A non-transitory recording medium storing a plurality of program codes which, when executed by one or more processors, cause the processors to perform a method for controlling a media conveying apparatus, the method comprising:

conveying a medium with a conveyor;

imaging the conveyed medium with an imager to obtain an image;

determining whether the conveyed medium has an adhering object;

controlling the conveyor to stop conveyance of a subsequent medium following the conveyed medium based on a determination result indicating that the conveyed medium has an adhering object;

controlling the conveyor to resume medium conveyance according to a received instruction to resume medium conveyance; and in response to completion of conveyance of a first medium that is firstly conveyed after medium conveyance is resumed, controlling the conveyor to stop medium conveyance again based on a determination result indicating that the adhering object is not on the first medium or the adhering object is displaced on the first medium.

* * * * *